July 11, 1961 F. V. ADAMS ET AL 2,992,413

DATA STORAGE SYSTEM

Filed June 28, 1955 11 Sheets-Sheet 1

INVENTORS
FRANCIS V. ADAMS
BY WILLIAM L. SWANTON

ATTORNEY

July 11, 1961 F. V. ADAMS ET AL 2,992,413

DATA STORAGE SYSTEM

Filed June 28, 1955 11 Sheets-Sheet 2

*INVENTORS*
FRANCIS V. ADAMS
WILLIAM L. SWANTON

BY

ATTORNEY

INVENTORS
FRANCIS V. ADAMS
WILLIAM L. SWANTON
BY
ATTORNEY

INVENTORS
BY FRANCIS V. ADAMS
WILLIAM L. SWANTON
ATTORNEY

INVENTORS
FRANCIS V. ADAMS
WILLIAM L. SWANTON
BY
ATTORNEY

July 11, 1961 F. V. ADAMS ET AL 2,992,413

DATA STORAGE SYSTEM

Filed June 28, 1955 11 Sheets-Sheet 6

*INVENTORS*

FRANCIS V. ADAMS

WILLIAM L. SWANTON

*BY* [signature]

ATTORNEY

INVENTORS
FRANCIS V. ADAMS
WILLIAM L. SWANTON
BY
ATTORNEY

INVENTORS
FRANCIS V. ADAMS
WILLIAM L. SWANTON
BY
ATTORNEY

INVENTORS
FRANCIS V. ADAMS
WILLIAM L. SWANTON
BY
ATTORNEY

INVENTORS
FRANCIS V. ADAMS
WILLIAM L. SWANTON

BY [signature]

ATTORNEY

DATA STORAGE SYSTEM

Filed June 28, 1955

INVENTORS
FRANCIS V. ADAMS
WILLIAM L. SWANTON

BY [signature]
ATTORNEY

1

2,992,413

DATA STORAGE SYSTEM

Francis V. Adams, Endicott, and William L. Swanton, Glen Aubrey, N.Y., assignors to International Business Machines Corporation, New York, N.Y., a corporation of New York Filed June 28, 1955, Ser. No. 518,522

16 Claims. (Cl. 340—172.5)

The present invention relates to data storage systems and, more particularly, to such systems wherein a plurality of groups of data information are stored in successive order. While the invention is of general utility, it has particular utility in systems employing magnetic storage media and will be described in that environment.

There are numerous applications in the use of present day business machines where it is desirable to store information for various periods of time in order that the information may be available for later use. Data information is usually supplied into storage from data cards used to record data information to be processed or the results of data processing or both. These are conventionally moved card by card past reading stations where the data information is read from the card and translated to storage. The data information of these cards usually varies in quantity from card to card, so that the data information supplied in serial form to storage is more often of random lengths. If card storage capacity in the storage medium is of fixed value as determined by the maximum data information which may be available from any card, inefficiency and waste of the full available storage capacity of the medium results.

It is proposed in accordance with copending application Serial No. 470,882, filed November 24, 1954, in the name of Francis V. Adams, entitled "Compacted Word Storage System," and assigned to the same assignee as the present invention, that data information read from cards be compacted at the reading station so that all of the available information is translated into storage essentially in continuous form with respect to each data card. The storage medium conveniently is comprised of a plurality of magnetic storage tracks which are successively filled with stored data information, and the arrangement last mentioned proposes that the efficiency of storage be increased by continuing storage in any one such storage track until the information from a new card is predetermined by trial to be of greater length than the available remaining storage capacity of the track at which time a transfer to a new track is made.

The present invention is an improvement on the arrangement disclosed in the copending Adams application, and takes advantage of the fact that all of the data information from any data card may and usually is divided into several fields each distinguishable by identifying field marks. Accordingly, the data storage system of the present invention operates to store data into each given section of a storage medium until that section becomes filled to a predetermined value after which the data translated to storage is tested field by field against the remaining available storage capacity of the section.

The transfer to a new section is not made, however, until there has been stored such maximum number of entire fields of a last card as can be accommodated without exceeding the finite storage capacity of the storage section.

It is an object of the present invention to provide a new and improved data storage system which enables maximum storage of data information in a given value of storage medium capacity.

It is a further object of the invention to provide a novel data storage system which responds to the condition of near-full storage of a storage medium and thereafter automatically tests to ascertain what maximum amount of the data information presented for storage can be accepted into the available remaining storage capacity of the medium, and thereupon operates to store the data in maximum amount in conformity with the results of such test.

It is an additional object of the invention to provide a novel data storage system particularly suited for use in an arrangement where successive groups of data information are translated to and from storage, and one in which transfer from one storage section to another of the storage medium may be effected at field separation points of any data group. This avoids the necessity of storing each group in its entirety in a given section of the storage medium, and thus substantially increases the efficiency of use of the available storage capacity of the medium.

It is yet a further object of the invention to provide an improved data storage system which automatically and continuously checks the accuracy of its own storage operation. There is provided in the event of improper operation for any of several reasons an error indication which may be audible, visual, or used to effect correction of the error as desired.

It is an additional object of the invention to provide a new and improved data storage system which effects storage of successive groups of data information in continuous fashion in a storage medium with the end of one data group forming a continuation of the information content beginning a succeeding data group, and with the information content which completes the storage capacity of one storage section of a storage medium forming a continuation of the information content beginning a succeeding section of the storage medium.

It is yet another object of the invention to provide a novel data storage system which permits asynchronous operation as between an associated business machine supplying data information and the storage system which receives and stores the information, and particularly one having such flexible interconnection between the business machine and the storage system that the two have a coordinated operation in effecting translation of the data information yet may have independent modes of operation insofar as their own particular functions are concerned.

Thus in accordance with the invention, a data storage system comprises storage means having a finite data storage capacity, and means for translating groups of data information to storage in the storage means, each such group of information having individually distinguishable data subdivisions. The system includes means responsive to the condition of data storage exceeding a predetermined quantity for predetermining prior to storage and for at least one further data group the number of data subdivisions thereof which can be accepted in entirety into storage without exceeding such finite storage capacity. The system further includes means responsive to such predetermination for controlling the translating means to limit the translation to storage of the predetermined number of data subdivisions of that one of such further data groups which if translated in entirety into storage would require the storage means to store in excess of its finite storage capacity.

A specific embodiment of the invention is described below and illustrated in the drawings, in which.

Figure 2:
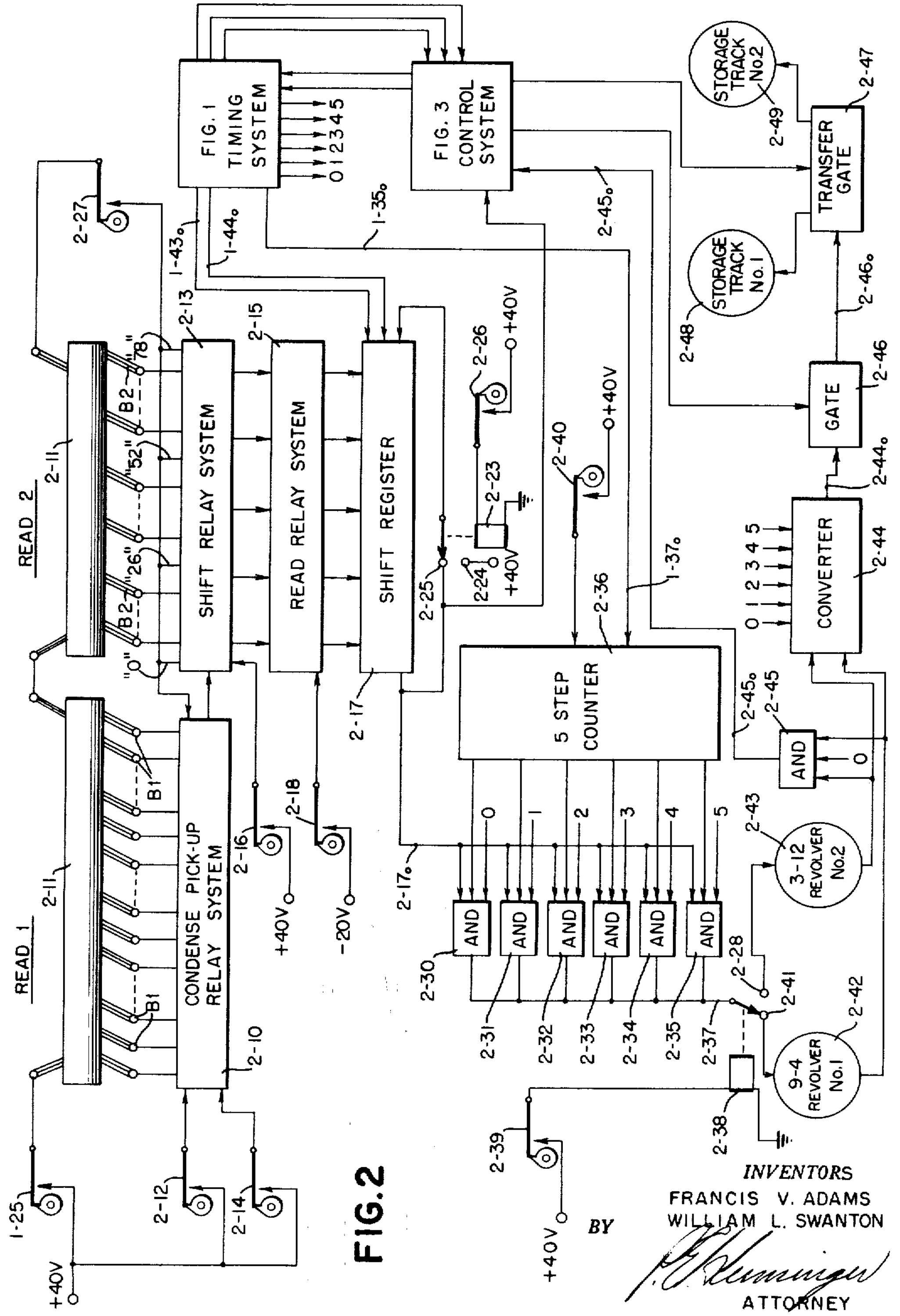
FIG. 2 represents schematically a data storage system embodying the present invention in a particular form.
Figure 2A:
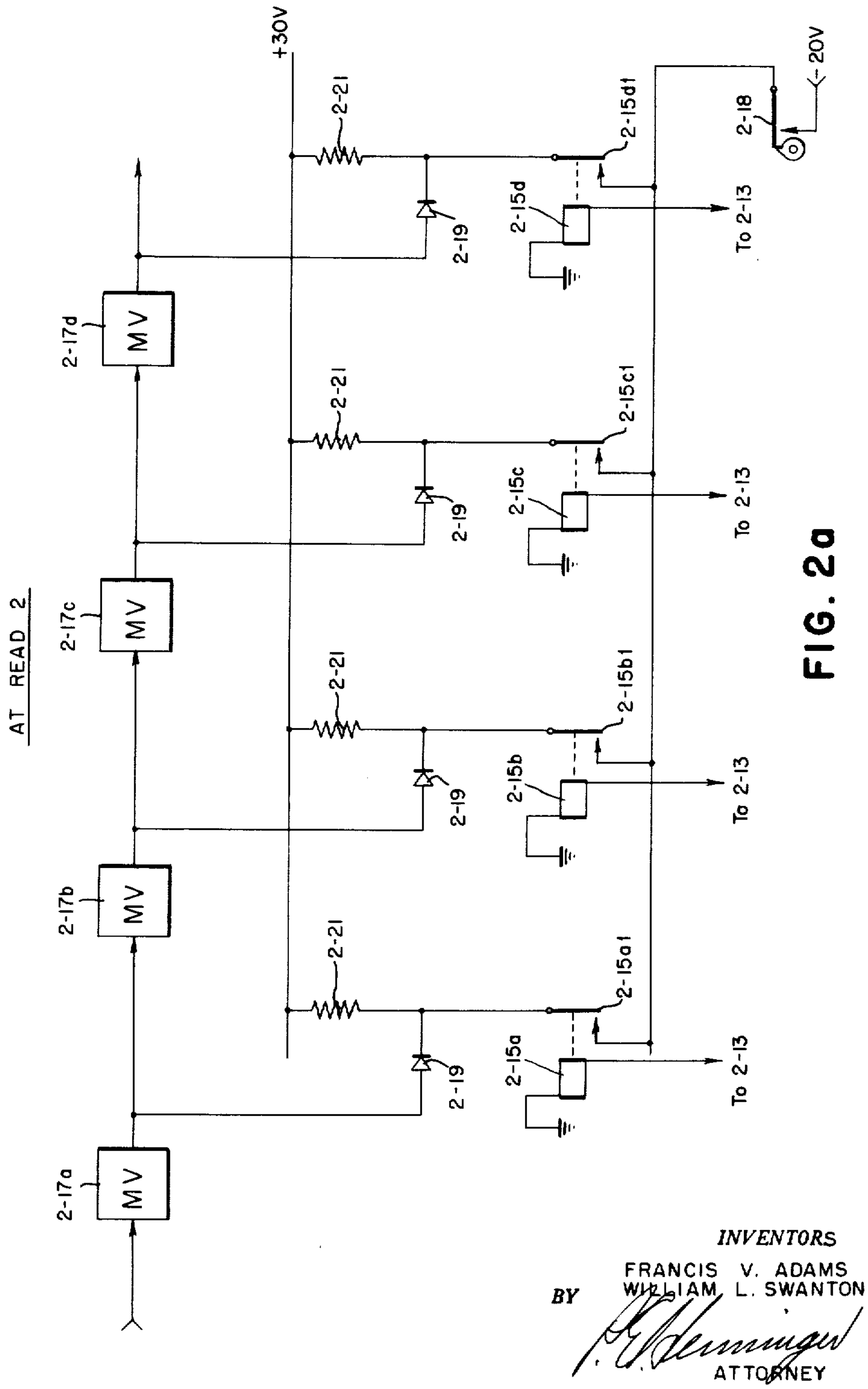
Figures 3A, 3E:
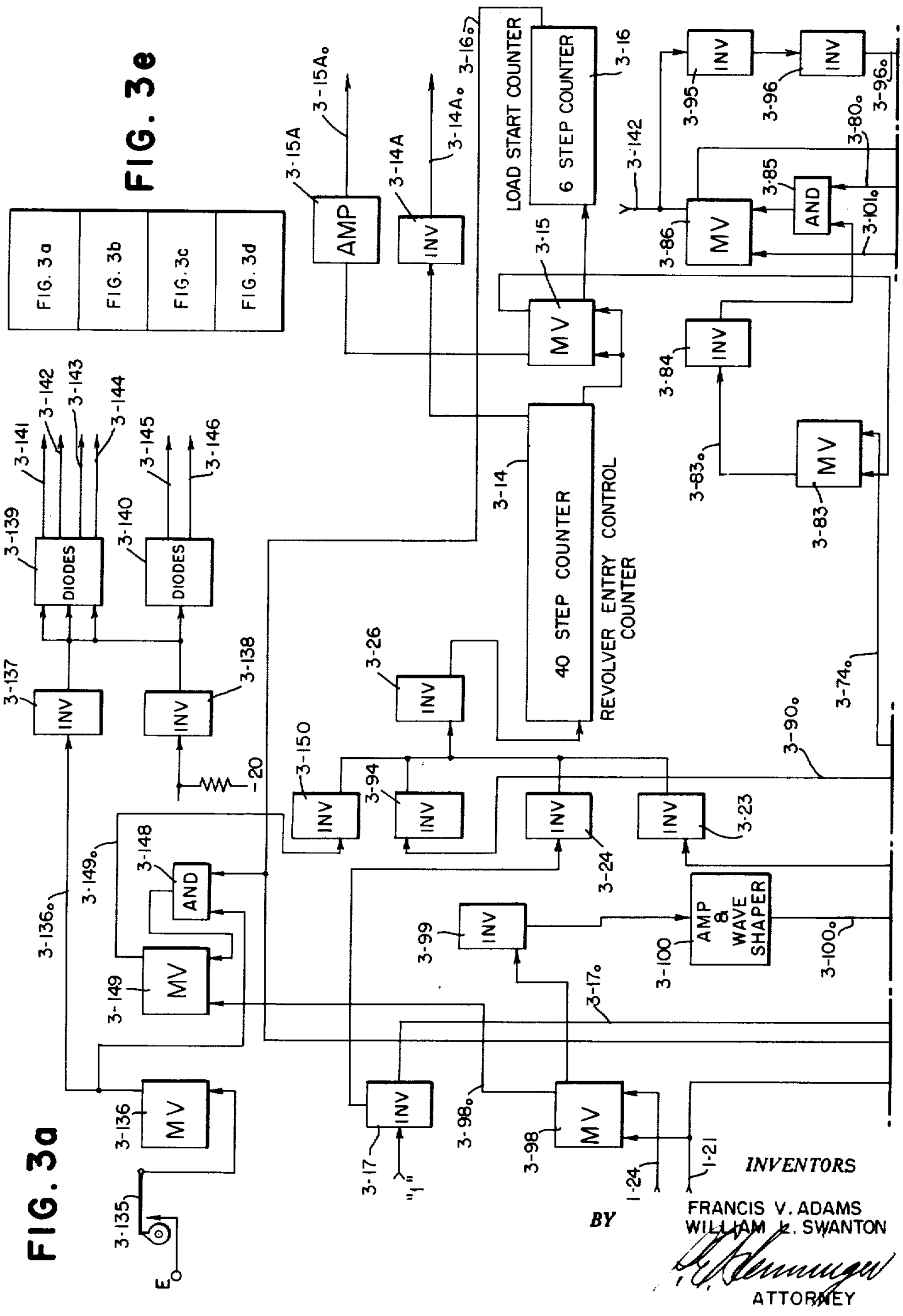
Figure 3B:
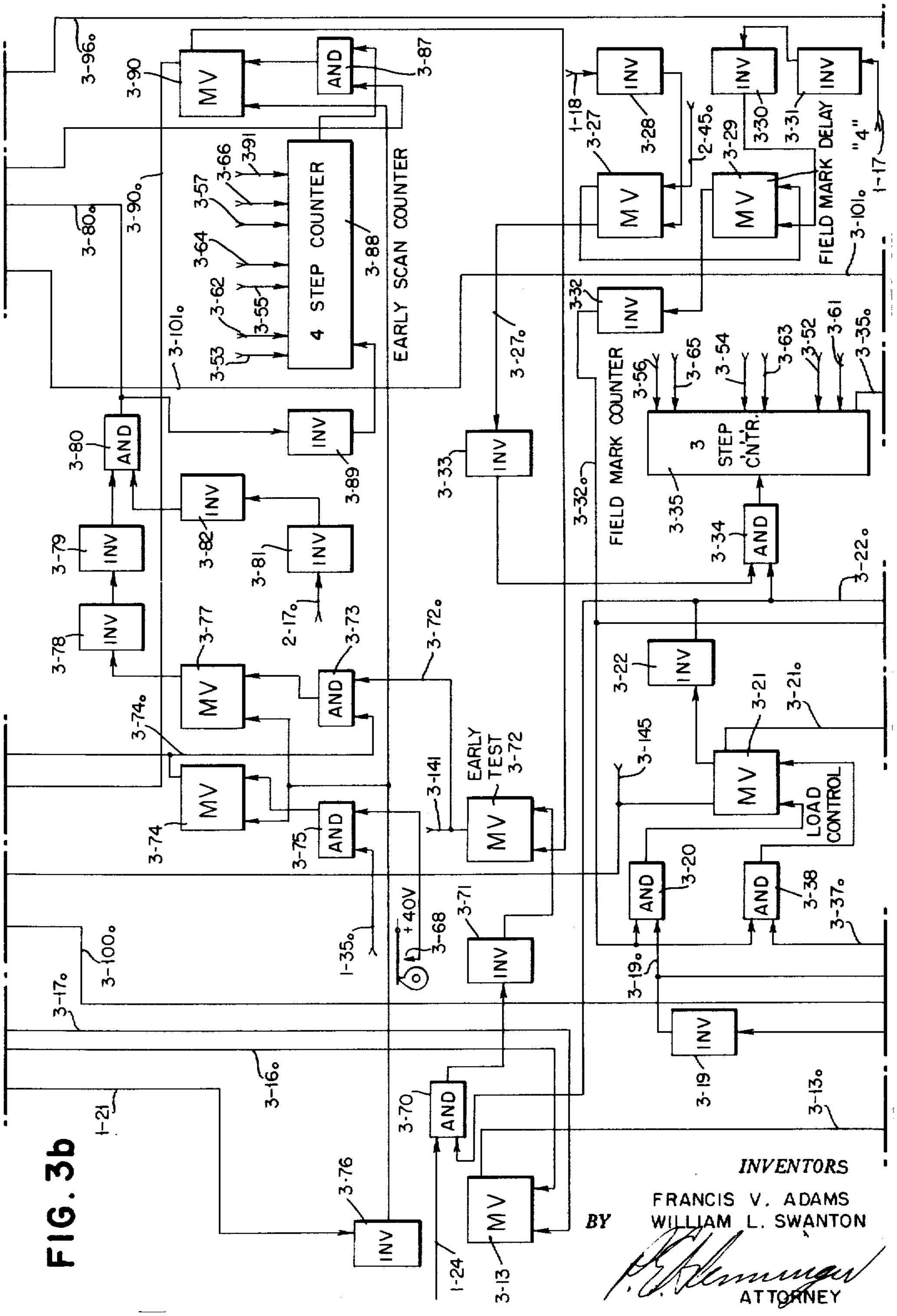
Figure 3C:
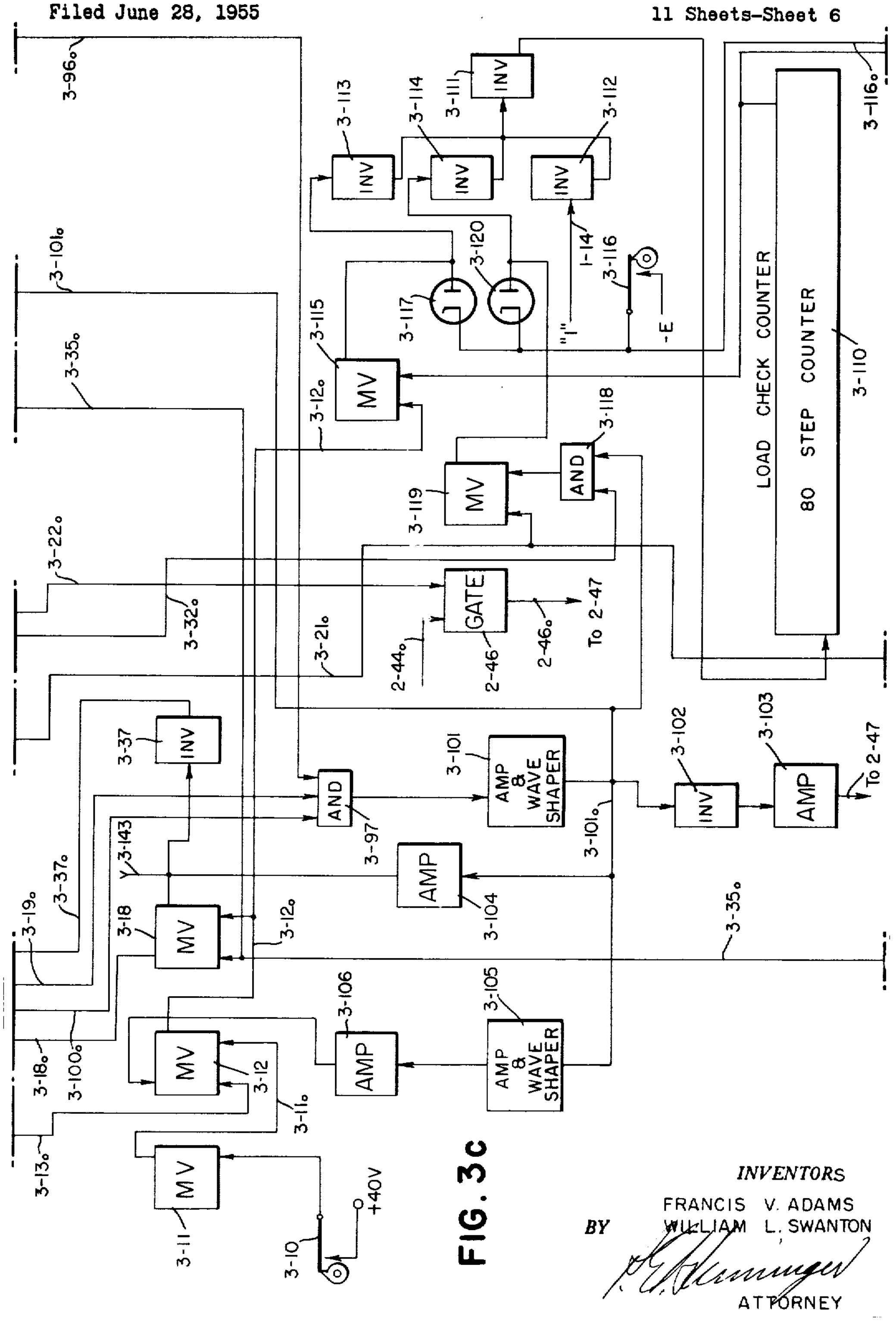
Figure 3D:
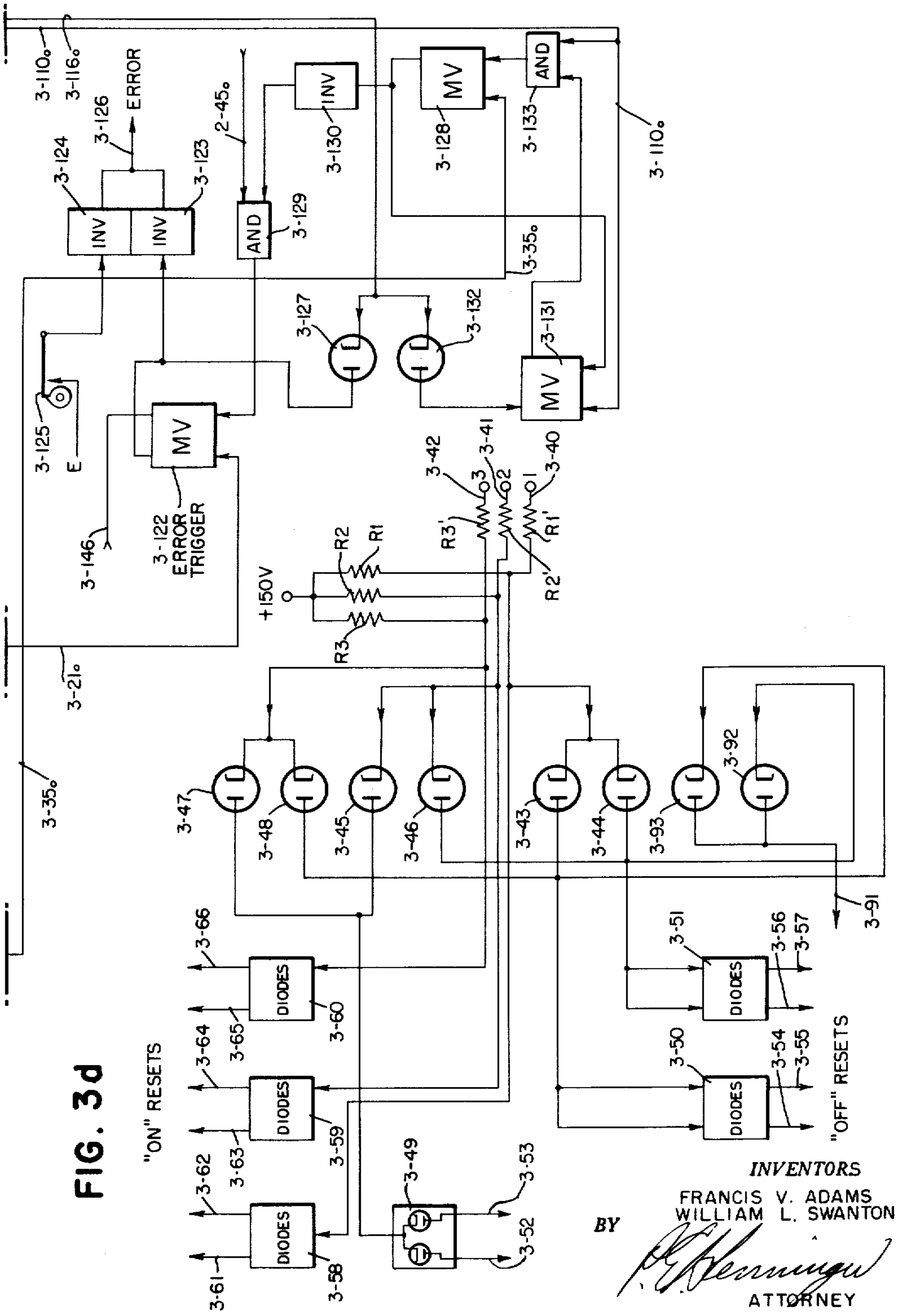
Figures 4, 5:
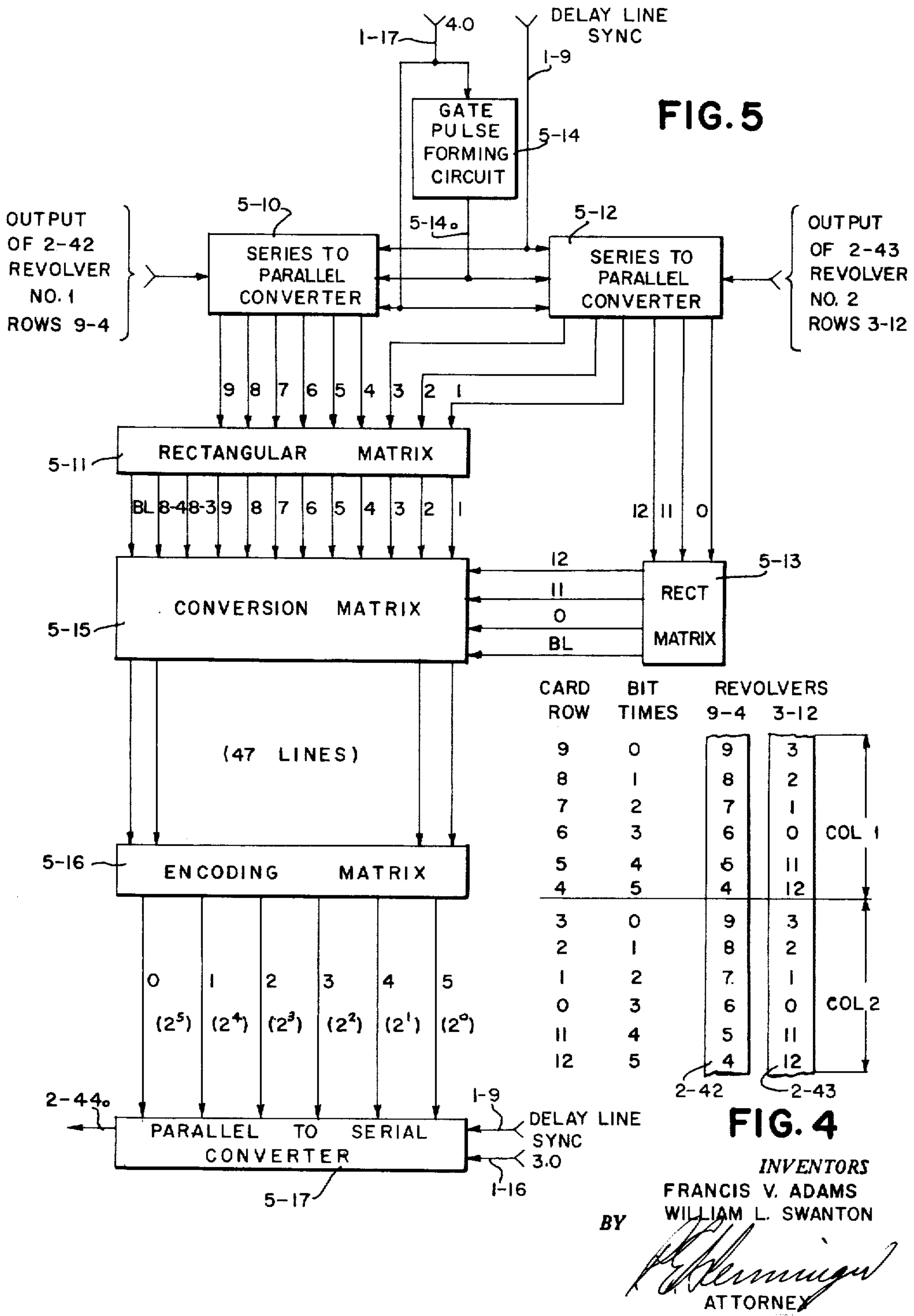
Figure 6:
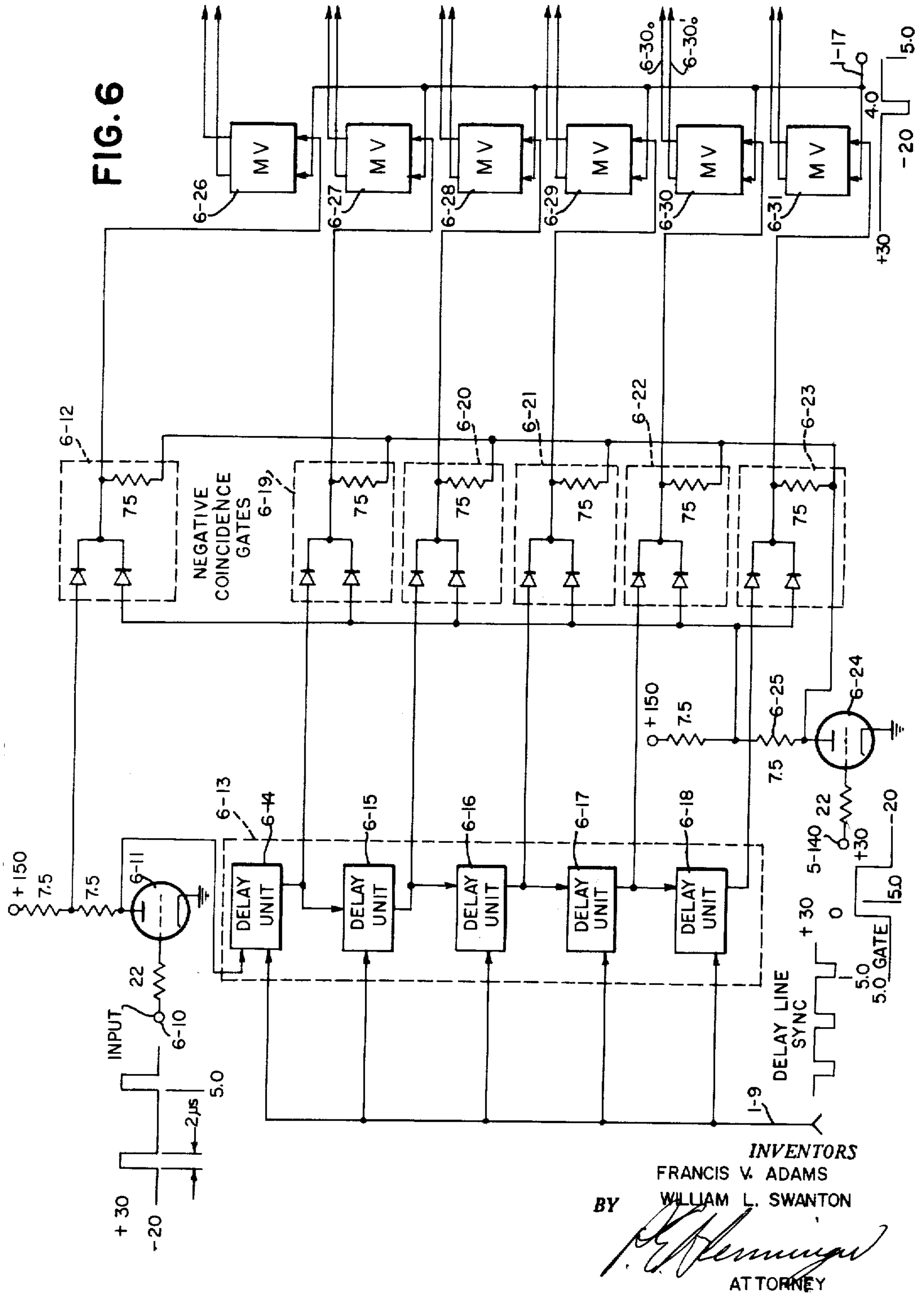
Figure 7:
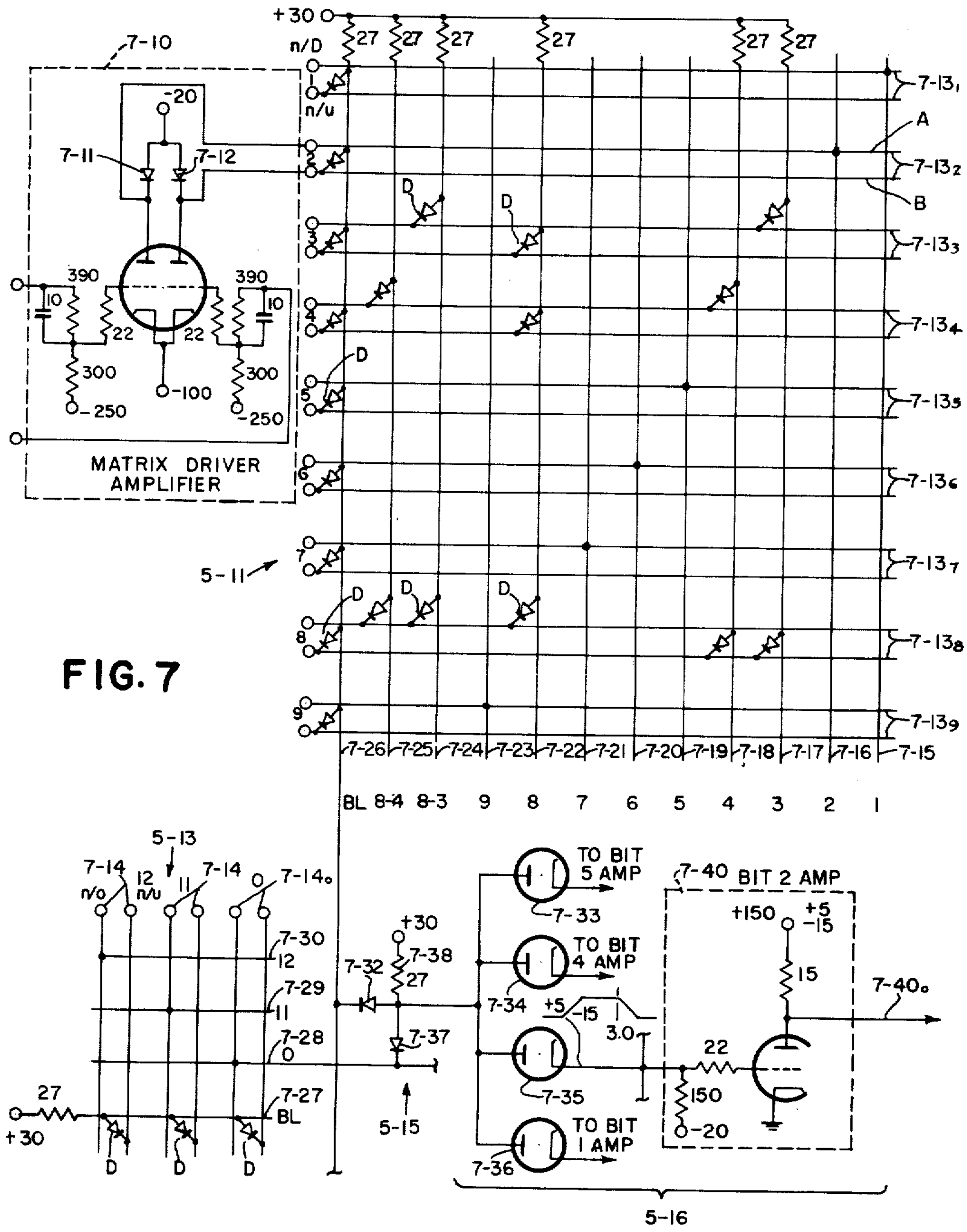
Figure 8:
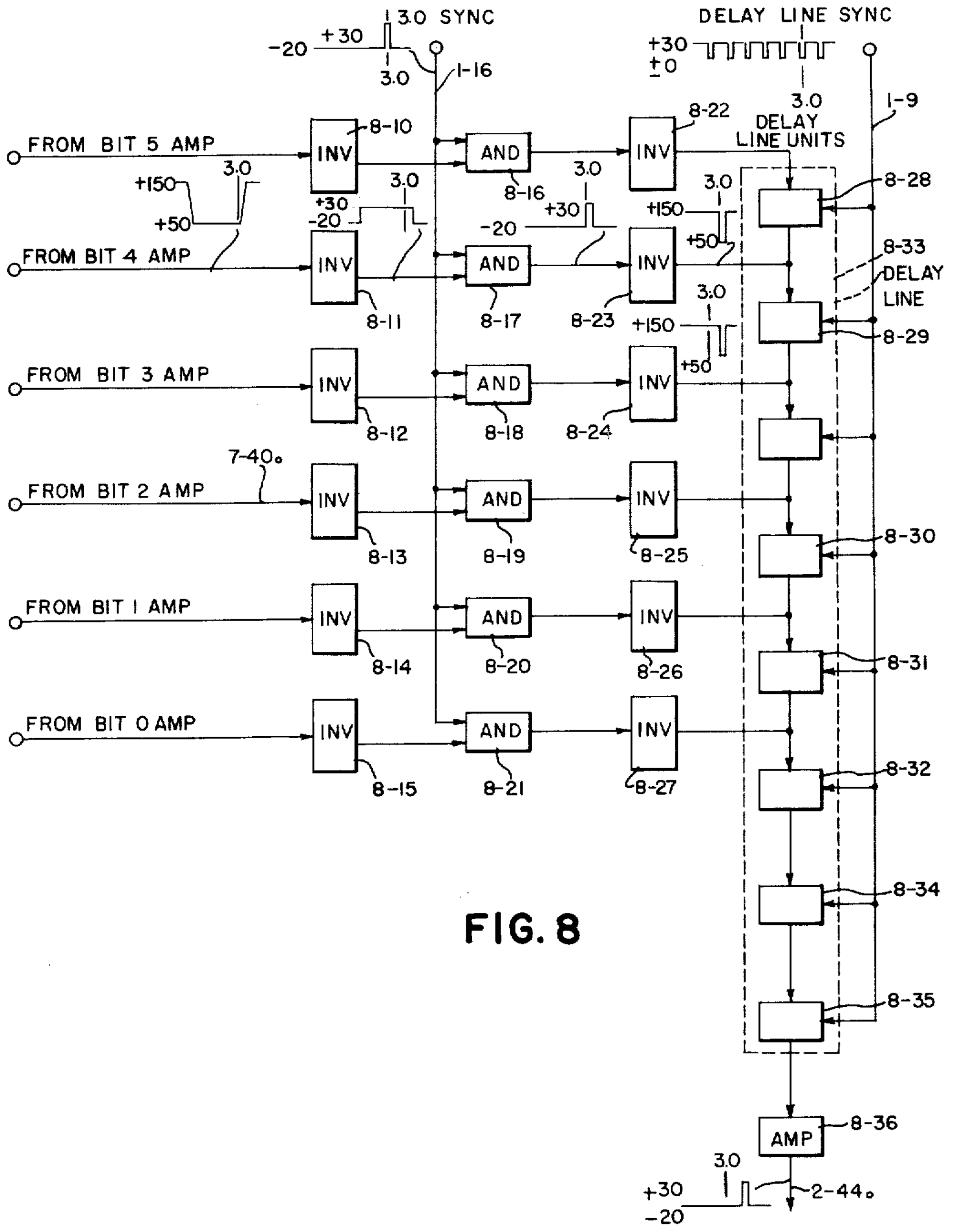

FIG. 2*a* is a circuit diagram of a portion of the FIG. 2 arrangement;

FIGS. 3*a*–3*d* represent schematically a control system used in the data storage system herein described, FIG. 3*e* showing the manner in which FIGS. 3*a*–3*d* should be considered together as a unitary system;

FIG. 4 illustrates the physical bit storage relationship in two revolvers used in the storage system;

FIG. 5 represents schematically the construction of a decoder employed in the system; and FIGS. 6, 7 and 8 are circuit and schematic diagrams representing the constructions of the several units used in the FIG. 5 decoder.

GENERAL ORGANIZATION AND OPERATION

The data storage system of the present invention provides an arrangement suitable for transferring data information from data cards to a storage medium, such as a plurality of storage tracks provided on a magnetic storage drum. The system operates with its own inherent built-in timing arrangement, which need not be synchronously related to the operation of the associated business machine to which data cards are fed for reading. A shift register provides a flexible or buffer linkage between the system and the asynchronously operated associated business machine. Data information input to the shift register is under control of the associated business machine through cam actuated circuit breakers forming components of the latter. Data output from the shift register is under control of the data storage system, the operation of the latter being referenced to the movement of the magnetic storage drum used therein.

As each data storage card is read at a first reading station of the business machine, the punched-index-point holes of the card actuate a relay system of the type disclosed in the aforementioned Adams application which operates to condense the data information to the minimum possible length when presented for storage in serial form. The storage system is described herein as one arranged for use with data cards having a maximum of three fields, and essentially uses three banks of the type of relay system disclosed in the aforementioned Adams application. Thus there is a relay bank for each field of the card, and each such bank operates to condense the data information of its associated field to minimum length and to identify each such condensed field by a field marker. Accordingly there will be an initial or beginning field mark positioned at the beginning of the serially presented information from a data card, and there will be a maximum of three suceeding field marks of which the last identifies the end of the third field of the card.

The three banks of condensing relay systems last mentioned are arranged to present the data information translated by them in parallel fashion to the shift register of the storage system. The data thus entered into the shift register is shifted out of the end of the latter, and is translated in the proper bit position to two temporary magnetic storage tracks or revolvers with that portion of the data information appearing in rows 9 through 4 of the data card arranged for storage in the first revolver and the data of rows 3 through 12 arranged for storage in the second revolver. After completing this temporary storage in the revolvers, the data information is read out of the revolvers and through a conversion unit which converts the 12-row card code to a 6 bit binary drum code. This coded data information is then writen into the storage tracks of the storage drum.

Since the business machine and the storage system operate asynchronously, the former provides no predesignated starting point in drum storage for the stored data information. The storage system itself controls the starting points in drum storage for the stored items of data, and in particular so controls storage track writing that the data from one card follows immediately behind the previous card data. For this purpose, the storage system provides for timing and location reference functions five reference time signals of pulse wave form as follows: first, one having 480 "C" or character Sync pulses during each storage drum revolution and effecting division of the storage drum track into 480 equal character segments; secondly, an electrical signal having 6 "S" or sector pulses per drum revolution which divide the storage track into six equal sectors each having 80 character segments; thirdly, an electrical signal having one pulse per drum revolution, this pulse being a Home pulse occurring approximately coincident with one of the "S" pulses; fourthly, an electric signal having six grouped pulses occurring within a character interval; and fifthly, a bit synchronizing signal having the same periodicity as the last-mentioned signal and used with it to identify and control the translation bit by bit of the data information into storage.

An important phase of the operation of the storage system is under control of a counter, which may be of the binary form, having a capacity of 480 counts and operating under control of electrical pulses related to the C or character Sync pulses. Thus, if the counter is started at any particular drum time, for example at "H" time, and allowed to run continuously it will carry out or pass through 0 each drum revolution at H time. The counter includes an 80 step section which will carry out or pass through 0 six times each drum revolution and thus be analogous to the read out from an 80 character revolver in which the H pulse had been written. This counter provides the time reference for the control of transfer of data information from the shift register into the two revolvers, and for the start of transfer of information from the revolvers into a storage track of the storage drum.

Since a substantially direct transfer from the revolvers to the storage track is to be made, the location of writing on the track is fixed by the location in the revolver of the data to be written. Therefore, establishing the location where data is to be written on a storage track is accomplished at the time this data is entered into the revolvers. The position of the data entry in the revolvers is determined by the time at which the transfer from shift register to revolver occurs, and this time is under direct control of the counter earlier mentioned.

All of the magnetic drum storage tracks start loading at the first "S" time after the Home pulse, and this time is hereinafter referred to as "S1." On run-in cycles preparatory to a loading run, the load control counter is stopped at its carry out or 0 step until S1 time and is then allowed to run so that it again carries out to produce a "load start" pulse at every S1 time. It will be apparent that the 80 step section of the counter produces "revolver entry control" pulses at each S time. The revolver entry control pulses provide the time control to start data transfer from the shift register to the two revolvers. After the data of each card is assembled in the revolvers, the associated business machine calls for a transfer operation from the revolvers to the storage tracks but the actual transfer nevertheless takes place under control of revolver entry control pulses of the counter. During the actual transfer of data information into the storage track, the counter remains at a two character count past zero but resumes counting as soon as writing into storage is completed. The counter accordingly will start from its zero plus two character count position where writing was terminated and will pass through this position each time the storage drum reaches the end of the last written record. This, of course, is the point at which the start of a new storing operation should occur. This storage procedure continues on a card by card basis until the storage track is nearly full, at which time a test is made to determine whether the remainder of the available storage capacity of the track can accommodate the next record to be written.

The test last mentioned is initiated, but not always completed, each time a store operation occurs. In the system described herein, 78 card columns of data are used for recording information in the data card. Accordingly, no card can contain more than 78 columns of data so that a storage track advance will not be required until there are 78 or less vacant character segments left on the track being loaded. Since there are 80 segments in each track sector, and since initial track loading started at S1 time, the determination whether a track advance may be required is made by sensing whether or not the Home or H position of the track is passed during a loading operation. If H time does occur during the load transfer from revolver to storage, it indicates that the present storage operation will use at least a portion of the last track sector and therefore the next group of data information to be stored from the succeeding card could contain a record of such length that the remaining storage capacity of the track could not accommodate it.

When this condition is encountered during loading, a test is made by comparing the length of data information from the next card against the remaining storage capacity of the track. This test is made prior to reading the next card for loading but after the card information has been compressed at the first read station. Advantage is taken of the fact that the field marks accurately indicate the length of each compressed field as well as the beginning and end of the compressed card information. Accordingly, the test is made by use of the field marks alone and for this purpose the field marks as compressed at the first reading station are alone transmitted to the shift register which is closed upon itself at this time to constitute a revolver. Since the load entry counter furnishes an accurate positional indication of the end of the preceding record in the storage track, the field marks of the newly entering card are compared against the 80 character operating interval of this counter. The comparison is actually made by a field mark counter, which in effect measures the time duration and thus the character storage requirements which the newly entering card will require for storage of its data information.

In making this comparison it has previously been determined that the remaining available storage capacity of the track is concerned only with the H to S1 sector, so that the actual track situation can be ignored and the comparison performed on a revolver basis (any S to S interval) instead of a track time basis. Thus all the information necessary to handle a track advance operation is provided by S pulses, revolver entry control pulses, and the field mark pattern of the newly entering card considered on a revolver basis. If all field marks occur between the time when the revolver entry counter starts its count and the next S time, then there will be no field marks between this S time and the carry out or 0 time indicating the completion of count by the counter. Thus if the comparison shows no field marks in the interval last mentioned, it is known from this comparative test that all of the information of the newly entering card will fit within the remaining available storage capacity of the storage track and no track advance will accordingly be necessary for this card. Once storage has extended into the H to S1 sector, the comparative test mentioned is continued card by card until eventually a card is reached wherein the comparative test shows a field mark to exist between S time and the carry out of the revolver entry counter. This condition establishes that the data information of that card cannot all be stored in the storage track then in use, and accordingly that an advance must be made to a new storage track.

When a track advance becomes necessary, the operation is such that storage is temporarily halted while the field marks of the newly entering card take over control of the timing of the revolver entry counter. In doing so, the counter operation is temporarily halted when the field mark counter counts to the total number of field marks of the newly entering card. The entry control counter is started again by the next S pulse, and the shift register read out of the data information to the data storage revolvers is now controlled by this new timing of the revolver entry control counter. The temporary halting of the latter has the effect that the terminating data of the last card information loaded on the near-full storage track usually will be spaced from the beginning information of the last card to be loaded into this track. Additionally, the revolver entry control counter has now been so timed that one of the field marks of the newly entering card will always occur coincident with S1 time, and the track advance is made at S1 time. Thus one or more fields of the newly entering card are stored in the first storage track and the remaining fields of this card are stored in the second track after track advance. The loading operation in the second track always starts at S1 time in the same manner as though this track were the initial track to be loaded.

ELECTRICAL TIMING SYSTEM

Figure 1:
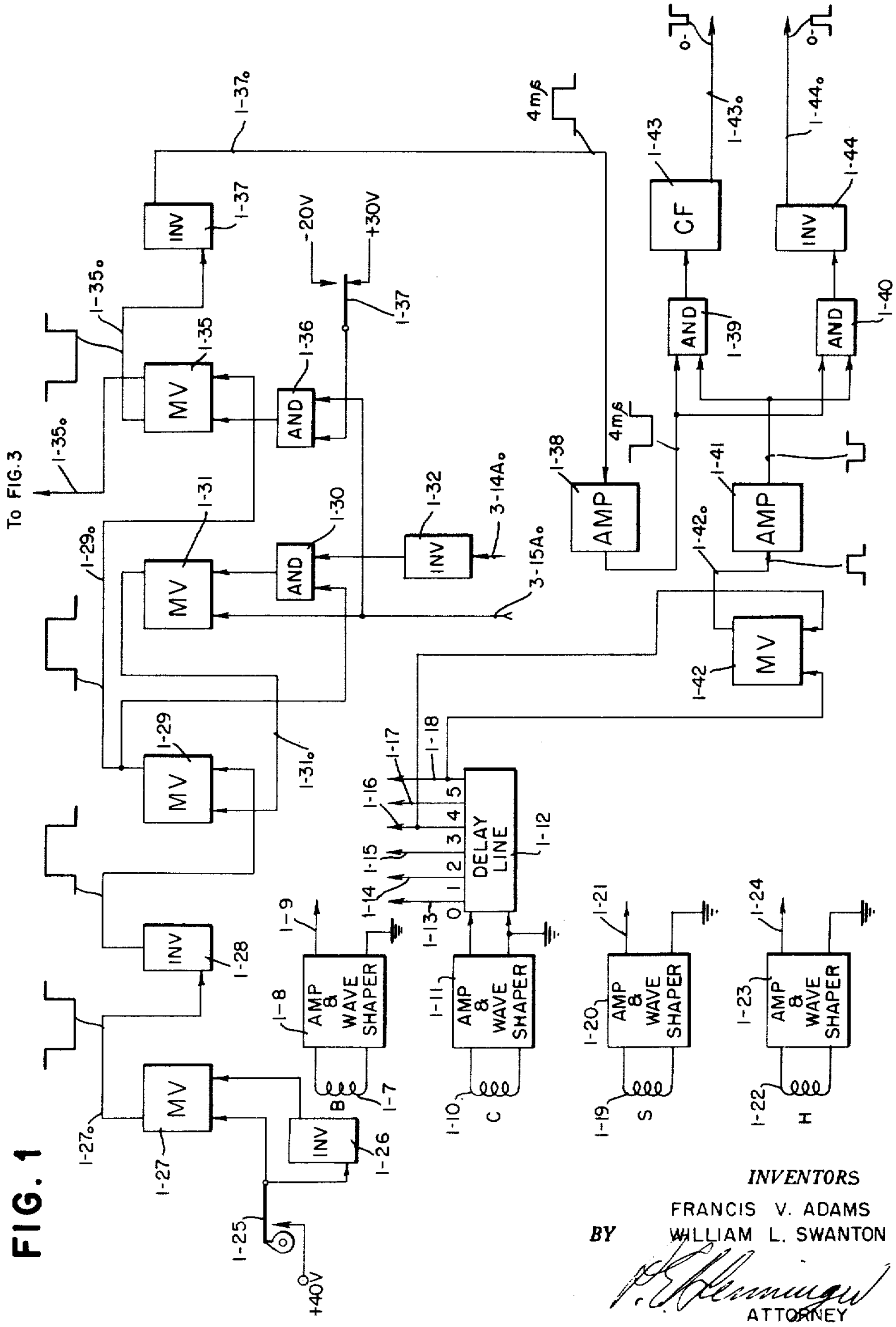
FIG. 1 represents schematically an overall timing system employed in the data storage system described herein.

Refer now more particularly to FIG. 1, which represents schematically an electronic timing control system used to control the timed operation of the word storage system. The system employs four timing tracks, more fully described in copending application Serial No. 464,516, filed October 25, 1954, now Patent 2,919,429, December 29, 1959, in the names of Francis E. Hamilton et al., and assigned to the same assignee as the present application. These timing tracks move in unison with the revolvers and information storage tracks, and one generates "C" or character synchronizing pulses which divide a drum storage track revolution into 480 equal character segments. The second timing track generates six "S" sector pulses which divide the storage track drum revolution into six equal 80 character sectors. The third timing track generates one "Home" pulse which is a single reference point in the storage track drum revolution and is approximately coincident with one of the "S" pulses. The fourth timing track generates continuous B or bit pulses of bit periodicity for bit synchronization purposes.

The last-mentioned track has a pick-up head 1–7 coupled to the input of an amplifier and wave shaper 1–8 having an output circuit 1–9 in which is developed the bit synchronizing signal of 2 microsecond pulse duration and approximately 8.3 microsecond pulse period.

Associated with the C or character timing track is a pick-up head winding 1–10 which is coupled to the input circuit of an amplifier and wave shaper 1–11. The latter operates to receive the generated C pulses, amplify them to suitable amplitude, and shape them to pulses of rectangular wave form of approximately two microsecond pulse duration and 50 microsecond pulse period. These C pulses are applied to the input circuit of a tapped delay line 1–12 having a total time delay equal to the character period and having taps arranged to develop output pulses at 0–5 bit times as indicated.

Associated with the S or sector timing track is a read-head 1–19 likewise coupled to an amplifier and wave shaper 1–20 having an output circuit 1–21 in which are developed S pulses of rectangular wave form having a pulse duration of approximately 2 microseconds and a pulse period of 4 milliseconds. Associated with the "Home" timing track is a read-head 1–22 similarly coupled to an amplifier and wave shaper 1–23 having an output circuit 1–24 in which are developed "Home" synchronizing pulses of approximately 2 microseconds pulse duration and a pulse period of 24 milliseconds or one drum revolution.

A master circuit breaker or "CB" 1–25 (as well as other "CB's" later mentioned herein) forms a component of the card reading machine which may be of conventional arrangement, such as shown in United States Patent No. 2,672,283, granted to Byron L. Havens, used to read punched business cards conveying the message information to be stored. The master CB 1–25 closes its contacts for 8° machine time and opens its contacts for 7° machine time repetitively beginning approximately 8° after 0° machine time of a card reading cycle. The latter has a duration of 360° machine time at each of two card reading stations, or a total of 720° machine time. The CB 1–25 on closing its contacts applies a positive potential through an inverter 1–26 to the input circuit of a bistable multivibrator 1–27 to turn the latter on at the time the CB contacts close. The multivibrator 1–27 is turned off again when these CB contacts open, thereby to develop in its output circuit 1–27*o* a potential pulse of rectangular wave form and having a pulse duration of 8° machine time with a separation between pulses of 7° machine time.

The pulse potential developed by the multivibrator 1–27 is translated through an inverter 1–28 to a multivibrator 1–29 to turn the latter on at the end of the translated pulse. The multivibrator 1–29 accordingly develops in its output circuit 1–29*o* a pulse potential which is applied to and conditions and AND gate 1–30 associated with a multivibrator 1–31. The AND gate 1–30 translates a pulse applied through an inverter 1–32 from an output circuit 3–14A*o* of a counter contained in a control system later to be described. The pulse last mentioned turns the multivibrator 1–31 on, and it is turned off by a pulse applied through a second output circuit 3–15A*o* of the counter last mentioned. During this cycle of operation of the multivibrator 1–31, a pulse potential is developed in its output circuit 1–31*o* which is used to turn off the multivibrator 1–29 coincident with turn off of the multivibrator 1–31. Thus the multivibrator 1–29 is turned on for an interval of approximately 2 to 6 milliseconds duration, the exact length of which is determined by the times of occurrence of the pulses applied from the output circuits 3–14A*o* and 3–15A*o* of the counter just mentioned.

The potential pulse developed in the output circuit 1–29*o* of the multivibrator 1–29 is used to turn on a multivibrator 1–35 at the trailing edge of each potential pulse. This multivibrator is turned off through an AND gate 1–36, which is conditioned by an early scan relay 1–37 during early scan time, by a pulse applied from the counter output circuit 3–15A*o*. This cycle of operation of the multivibrator 1–35 thus develops a pulse potential in its output circuit 1–35*o'* which is translated through an inverter 1–37 and an amplifier 1–38 to condition two AND gates 1–39 and 1–40. There is also applied to the latter gates a pulse potential translated through an amplifier 1–41 from an output circuit 1–42*o* of a multivibrator 1–42. This multivibrator is turned on at the trailing edge of the third bit pulse, developed in the output circuit 1–16 of the delay line 1–12, and is turned off by the trailing edge of the 5 bit pulse developed in the output circuit 1–18 of the delay line. The pulses thus developed in the output circuit 1–42*o* of this multivibrator have a pulse duration of approximately 17 microseconds and a pulse periodicity corresponding to the generated C or character pulses. These pulses when translated through the AND gates 1–39 and 1–40 are applied to a respective cathode follower 1–43 and an inverter 1–44 to develop in the respective output circuits 1–43*o* and 1–44*o* of these units advance pulses which are used to advance a shift register having an arrangement and function later to be described.

DATA READING AND STORAGE SYSTEM

FIG. 2 shows schematically the overall general arrangement of the word storage system of the present invention. The associated business machine includes a plurality of reading brushes B–1 at a first reading station which are connected to a "condense" pick-up relay system 2–10. The storage system is described herein by way of example as one for use with data cards having a maximum of three data fields, and the relay system 2–10 accordingly employs three banks of relays each arranged in the manner shown in FIG. 1 of the aforementioned Adams copending application. Reference is made to such application for the nature and arrangement of the relay system and the manner in which it operates to condense the length of the word information transferred into storage in a storage track. The pick-up windings of the relays of this system are energized through brushes B–1 from a common circuit 2–11 energized by the master CB 1–25 which is here shown again for convenience. The hold windings of these relays are energized through a CB 2–12 which closes at 9° machine time and opens at 354° machine time.

The associated business machine includes a second brush reading station having reading brushes B–2 energized by the energizing circuit 2–11 and coupled to a shift relay system 2–13 of the type shown as FIG. 2 of the Adams copending application. The relays of this system are energized by a CB 2–14 (which closes its contacts at 280° machine time and opens them at 290° machine time) through the relay points of the system 2–10. The brushes B–2 of the second reading station in particular are connected through the relay contacts of the system 2–13 to energize the relay windings of the read relay system 2–15, the relays of the system 2–13 being held for this purpose by a CB contactor 2–16 which closes its contacts at 275° machine time and opens them at 545° machine time (the total machine time for reading stations 1 and 2 being 720° machine time).

The relays of the system 2–15 have relay contacts which are coupled to a plurality of input circuits of a shift register 2–17 of the type disclosed in the copending application Serial No. 469,895, filed November 19, 1954, in the name of Genung L. Clapper, and assigned to the same assignee as the present application. A portion of the relay system 2–15 and the shift register 2–17 is shown in FIG. 2*a* to illustrate the manner of interconnection of these units. The relays of the system 2–15 are indicated as 2–15*a*—2–15*d* having respective contacts 2–15*a*1—2–15*d*1. One side of the relay contacts 2–15*a*1—2–15*d*1 are energized from a negative source of potential through a CB contactor 2–18. This contactor during read-in of card row 9 through 12 closes its contacts 4° after closure of the contacts of the master CB 1–25 and opens its contacts 1° before CB 1–25 contacts open, and also closes its contacts during 296°–299° machine time to provide an early scan test pulse. The negative potential translated through the closed contacts of CB 2–18 is applied through any of the closed relay contacts 2–15*a*1—2–15*d*1 and an associated diode rectifier 2–19 to individual ones of a plurality of tandem arranged multivibrators 2–17*a*—2–17*d* which comprise the shift register 2–17. The rectifiers 2–19 essentially constitute one element of an AND gate each energized through a resistor 2–21 from a source of positive potential indicated as +30 volts. It will be apparent that upon closure of the CB 2–18 contacts a negative potential is applied through any closed relay contacts and its associated diode rectifier 2–19 to change the operating condition of the associated multivibrator 2–17*a*—2–17*d* and thus store the information bit read at the reading brushes B–2 of the second reading station.

The shift register 2–17 is stepped by the pulses developed in the output circuits 1–43*o* and 1–44*o* of the FIG. 1 timing system, and the information bits stored in parallel fashion in the shift register in the manner last described are stepped out end-wise into an output circuit 2–17*o* of the shift register and appears in this output circuit as information bits presented in serial form. During the card reading interval at the second reading station, beginning at 360° machine time and continuing to 570°, a relay 2–23 is operated by a CB 2–26 to close its contact 2–24 and apply a positive potential to the first multivibrator of the shift register 2–17 so that zeros are stored in the multivibrators successively as the shift register is stepped to provide serial information read-out as last mentioned. This conditions the shift register for read-in of the next card. The relay 2–23 includes a second contact 2–25 which when closed connects the output stage of the shift register 2–17 to the input stage thereof during "early scan" time, which is 210° to 360° machine time, so that during this interval the information stored in the shift register (which it will be shown later comprise only field marks) is recirculated therein as the register is stepped under control of the FIG. 1 timing system.

The field marks last mentioned are inserted at the second reading station and indicate the beginning and ending time of each field used in the read card. To this end, brush positions 0, 26, 52 and 78 are not used for card reading at this station, but these brush positions of the shift relay system 2–13 and read relay system 2–15 are connected to a CB contactor 2–27 which is connected through CB 1–25 to a positive potential source and is timed to generate pulses corresponding to both "9" and "3" bit information in the 0, 26, 52 and 78 column positions of the card. For this purpose, CB 2–27 closes its contacts from 365° to 377° machine time (a "9" bit pulse) and from 455° to 467° machine time (a "3" bit pulse). It might be mentioned at this point that the CB 2–27 also generates an "early scan" pulse from 290° to 302° machine time for use in the early scan operation presently to be described.

The field marks which are circulated in the shift register 2–17 during early scan time, and also those which later become stored with data information in the register, are applied to a control system which is shown in FIG. 3 and has an arrangement and mode of operation later to be described. The field-mark and data information serially presented in the output circuit 2–17*o* of the shift register during the "store" interval is applied to each of a plurality of AND gates 2–30—2–35, which are sequentially conditioned by a 5-step counter 2–36 stepped under control of the output circuit 1–35*o* of the FIG. 1 timing system. These gates are individually further periodically conditioned by 0–5 bit time pulses applied thereto from the FIG. 1 timing system, and thus translate data information bits presented from the shift register to a common output circuit 2–37. The counter 2–36 does not reset itself, after stepping six times under control of the FIG. 1 timing system, but must be reset by a CB contactor 2–40 which closes its contacts at 360° to 367° and 450° to 457° machine time which immediately precede 9 and 3 card-row read times.

The output circuit 2–37 of the gates 2–30—2–35 is connected to the movable contact of a relay 2–38 which is energized by a CB contactor 2–39 arranged to close its contacts at 450° and open its contacts at 540° machine time. With the relay 2–38 deenergized to close its contacts 2–41 during 360°–450° machine time, the data information translated through the gate output circuit 2–37 is applied to storage in a first revolver 2–42, and during the period of energization of relay 2–39 the output is applied through relay contact 2–28 to storage in a second revolver 2–43. This arrangement of the gates 2–30—2–35, operating under control of the counter 2–36 and at bit times 0–5, and the relay 2–38 is such that the data information in card rows 9, 8, 7, 6, 5 and 4 is distributed into storage in the revolver 2–42 whereas the information in card rows 3, 2, 1, 0, 11 and 12 is distributed into storage in the revolver 2–43.

In particular, when gate 2–30 opens at each 0 bit time all of the data information in the 9 row of the card is distributed around the storage track of the revolver 2–42. Similarly, when gate 2–31 opens up at each 1 bit time, all of the information in the eighth row of the card is similarly distributed into the revolver 2–42. Thus the information stored in revolver 2–42 occurs in successive groups with the first group representing the first column of the card and containing in succession the information from rows 9 through 4, the second group containing information in the second column of rows 9 through 4, etc. with the last group containing information appearing in the 77th column in rows 9 through 4. In revolver 2–43 the successive groups of information represents successive columns and successive rows 3–12 of each column.

The output of the revolvers 1 and 2 contains the information of the card in parallel-series 12 bit card code, and is applied to a converter 2–44 to convert this information to a 6 bit binary drum storage code. The converter 2–44 is described in detail hereinafter and operates under control of 0–5 bit pulses from the FIG. 1 timing system. Due to the manner of distribution of the material into revolvers 2–42 and 2–43, the "9" and "3" of each field mark occurs at 0 bit time and accordingly are translated through an AND gate 2–45 which is opened by an 0 bit time pulse applied from the FIG. 1 timing system to this gate.

Each field mark translated by the gate 2–45 is applied to the FIG. 3 control system, which uses the field marks to control the operation of a gate 2–46 which translates the output of the converter 2–44 to a transfer gate 2–47. The FIG. 3 control system also controls the latter in such manner that the output of the converter 2–44 is stored in a first storage track 2–48 until it no longer has sufficient storage capacity to receive all of the information from a particular card. When this occurs, as many fields of the card as can be stored in the track 2–48 (this being determined by operation of the FIG. 3 control system) are stored in the latter track after which the FIG. 3 control system operates the gates 2–47 to store the remaining field or fields of this card in a second storage track 2–49 together with the information from subsequent cards. While only two such storage tracks are shown for purposes of simplicity, it will be understood that a larger number of storage tracks may be employed in a particular application, the FIG. 3 control system operating in such case to effect similar transfer from storage track to storage track in the manner described for the storage tracks 2–48 and 2–49.

ELECTRONIC CONTROL SYSTEM

The FIG. 3 control system is shown in detail in FIGS. 3*a*–3*d* which should be considered together in the manner shown by FIG. 3*e*. In describing the arrangement and operation of this system, it will be helpful to consider it according to the nature of the functions which it performs in the word storage system.

One of these functions is to control the store or loading operation by which data information is transferred from the converter 2–44 to storage in the storage tracks 2–48 and 2–49. A second function of this control system is to perform an early test, initiated in response to the occurrence of a Home pulse and having as its purpose to ascertain whether all of the data information from a card read at the second reading station will fit in its entirety into the remaining available storage space of the storage track then in use. When this early test shows that not all of the data information from the read card can be accomodated in the remaining storage space of the track, a third function of the control system is then so to arrange the further storage of data information that such field or fields of the read card as can be accommodated in entirety in the storage track is so stored. In this phase of the operation, the field mark which terminates the stored field or fields is made to coincide with the sector or S1 pulse indicative of the beginning of initial storage in the track in use, and the control system then causes a transfer from the old storage track to a new track and causes the remaining field or fields of the card to be stored in the new track beginning at S1 time. A further function of the control system is to perform a continuous check on the store or loading operation, and to provide an error indication in the event that any of several operational errors occur. A last function of the control system is automatically to reset itself at the outset of each operation of the word storage system, or likewise automatically to reset itself whenever the continuous flow of data cards past the reading stations is interrupted for any reason.

(1) STORE OR LOADING OPERATION

A first function of the FIG. 3 system is to time and control the loading operation from the converter 2–44 to the storage tracks 2–48 and 2–49. For this purpose, a CB contactor 3–10 is arranged to close its contacts at 541° machine time and to open them at 551° machine time. During the period when the contacts of CB 3–10 are closed, a positive potential is translated to a monostable multivibrator 3–11 and the leading edge of this potential pulse turns the latter on. Accordingly, there is developed in its output circuit **3–11*o* a potential pulse of approximately 10 milliseconds duration and the lagging edge of this pulse is used to turn on a multivibrator 3–12. The latter is turned off by a multivibrator 3–13, which is in turn turned on by a counter comprised by a 40-step counter 3–14, a binary counter 3–15, and a 6-step counter 3–16 all arranged in tandem. The counter 3–14 counts from 0 to 40 characters, the counter 3–15 from 40–80 characters and counter 3–16 from 80 to 480 characters. The manner and time of turning this counter on will be deferred for the moment, but the present consideration of the load operation phase of this system will be considered as starting at the time when the counter turns off after the 480th character count. In going off, it develops in its output circuit 3–16*o* a negative pulse which is applied to the multivibrator 3–13 to turn the latter on as earlier mentioned. This multivibrator is turned off by a 1 bit time pulse translated (from the FIG. 1 timing system) through an inverter 3–17**.

When the multivibrator 3–13 turns off, it turns off the multivibrator 3–12 which thereupon turns on a load set-up multivibrator 3–18. The output potential of this multivibrator is applied through an inverter 3–19 to condition an AND gate 3–20 to translate a pulse which is generated in a manner presently to be explained and occurs two character intervals delayed after the first or beginning field mark. This two character delay, it might be explained, is required due to an inherent two character delay in the converter 2–44 of FIG. 2. This delayed pulse is translated through the AND gate 3–20 to turn on a load control multivibrator 3–21.

The load control multivibrator 3–21 performs two essential functions. The first of these is to condition through an inverter 3–22 the AND gate 2–46 (shown in FIG. 2) for purposes of translating the output of the converter 2–44 to the storage track 2–4 or 2–49. The second function of the load control multivibrator 3–21 is to apply through an inverter 3–23 a "clamp" on the output of an inverter 3–24, which translates as advance pulses through an inverter 3–26 to the counter 3–14 "1" bit pulses supplied through the amplifier 3–17. Thus during the time the load control multivibrator 3–21 is on, the output of the converter 2–44 is written into storage in one of the storage tracks 2–48 or 2–49 and at the same time the application of advance pulses to the counter 3–14 is suppressed so that the latter stops counting. It will be evident from this that the counter stops counting when the storage operation begins, and does not resume counting until storage is terminated.

The reasons for this mode of operation of the counter are several. The first is so to control the operation of the FIG. 1 timing system that the entry of information into the revolvers 2–42 and 2–43 is correctly positioned therein with relation to the positon of the end of the message last stored in one of the storage tracks 2–48 or 2–49. The second function is to time the entry of the next succeeding storage operation through control of the load set-up multivibrator 3–18 with relation to the operation of the load start CB 3–10. A third function performed by the described control of the counter 3–14 is in the storage track transfer operation hereinafter described, and a further function of this control is in relation to the error check operations also to be described at a later point herein.

It was earlier mentioned that the load control multivibrator 3–21 is turned on by a pulse delayed two characters with respect to the first one of the field marks. This pulse is developed by applying the field marks translated by the gate 2–45 (FIG. 2) to turn on a multivibrator 3–27. This multivibrator is turned off by the leading edge of a 5 bit pulse translated through an inverter 3–28 from the FIG. 1 timing system. When the multivibrator 3–27 turns off, it turns on a multivibrator 3–29 which is in turn turned off by a 4 bit pulse translated through inverters 3–30 and 3–31 from the FIG. 1 timing system. Thus there is developed in an output circuit **3–29*o* of the multivibrator 3–29 a pulse which it is apparent has a trailing edge delayed approximately by a 2 character interval (actually 2 bit period less than 2 character intervals) from the first field pulse which turned the multivibrator 3–27 on, and it is this delayed pulse which is translated through an inverter 3–32 to the gate 3–20 to turn on the load control multivibrator 3–21**.

Field marks which follow the beginning field mark last considered are also applied from the gate 2–45 to the multivibrator 3–27, and each turns the latter on as earlier described. Since this multivibrator is then turned off by the leading edge of a 5 bit pulse, it develops in an output circuit **3–27*o* to potential pulse the trailing edge of which is delayed by 5 bit times (approximately one character interval) from the field mark which turned the multivibrator 3–27 on. These developed potential pulses are applied through an inverter 3–33 to an AND gate 3–34 which is conditioned by the inverter 3–22 when the load control multivibrator 3–21** is on.

The pulses translated by the gate 3–34 are used to step a 3-step counter 3–35 which is preset, in a manner presently to be pxeailned, for the number of fields appearing in each card read at the reading station. It will be noted that the first stepping pulse translated through the gate 3–34 occurs with a 5 bit delay after the first or beginning field mark. The pulse which is translated through the gate 3–20 to turn the load control multivibrator 3–21 on has a delay of 10 bits following the first or beginning field mark. Consequently, while a pulse is developed in the output circuit **3–27*o* by the beginning field mark, it is not effective to step the counter 3–35 for the reason that the AND gate 3–34 has not yet been conditioned to open by the on condition of the load control multivibrator 3–21. Thus it is only a field marks following the begining field mark which are translated by the AND gate 3–34 and are effective to step the counter 3–35**.

The later accordingly counts the actual fields of each card, and the last multivibrator of the counter 3–35 is turned off by the last or end field mark. This end field mark indicates the end of the data information of a card, and the last multivibrator of the counter 3–35 on turning off develops a potential in its output circuit **3–35*o* which turns off the load set-up multivibrator 3–18. When this occurs, the latter through an inverter 3–37 conditions an AND gate 3–38 so that the last field mark delayed by 10 bits is translated through the gate 3–38 to turn off the load control multivibrator 3–21 and thus shut down the gate 2–46 to terminate the loading operation. When the load control multivibrator 3–21 turns off, its clamping control exerted through inverter 3–23 is removed from the inverter 3–24 and 1 bit advance pulses are thereafter supplied to the counter 3–14, 3–15 and 3–16** which thereupon resumes counting.

The manner of setting up the 3-step counter 3–35 in accordance with the number of fields in the read card will now be considered.

The condense pick-up relay system 2–10 of FIG. 2 is arranged in 3 banks corresponding to the possible three fields of a card to be read. It is assumed that there will always be data information appearing in the first field, and if the first brush relay of a second field picks up to indicate information appearing in the second field this fact is used to indicate that there are at least two fields of information in the card. Similarly if the relay corresponding to the first brush position of the third bank of relays is energized, this is indicative of the fact that information will appear in all three fields of the read card. These first positon relays of each bank are so connected that an "x" or "11" level on "no-x" hole in a card may be punched to make the entire card a one-field card in which event a circuit 3–40 of FIG. 3 is connected to ground. Aside from this single field control, if the first relays of banks 2 and 3 are not picked up to indicate information appearing in either of these fields then the circuit 3–40 is again connected to ground effectively to indicate a one-field card. If the first relay of the second bank is also picked up, then a circuit 3–41 of FIG. 3 is grounded to leave circuit 3–40 ungrounded and thus indicate a two-field card. If the first relay in each of banks 2 and 3 picks up, a circuit 3–42 is grounded to indicate a three-field card. If the first relay in each of banks 2 and 3 picks up, a circuit 3–42 is grounded to indicate a three-field card. The grounding of the circuits 3–40, 3–41 and 3–42 is effected by a zero brush position relay energized through the CB contactor 2–27 at set-up time for loading.

Resistors R1 and R1' of FIG. 3 comprise a voltage divider between a source of positive potential, indicated as 150 volts, and the circuit 3–40 so that the junction of these resistors has a value of 150 volts if the circuit 3–40 is not grounded and a value of 50 volts if this circuit is grounded. The juncture of these resistors is connected to the cathode electrodes of a pair of rectifier devices 3–43 and 3–44 which remain non-conductive when the circuit 3–40 is not grounded but become conductive when the circuit is grounded. Similarly, resistors R2 and R2' comprises a voltage divider for the circuit 3–41 and the juncture of these resistors is connected to the cathode electrode of each of a pair of diode rectifiers 3–45 and 3–46. A resistor R3 and a resistor R3' comprise a voltage divider for the circuit 3–42, and the juncture of these resistors is connected to the cathode electrodes of diode rectifiers 3–47 and 3–48.

The anodes of the several rectifiers 3–43—3–48 are connected in pairs as shown to a plurality of units 3–49—3–51 each having a pair of rectifier elements arranged as indicated for the unit 3–49. The diode rectifiers of each such unit constitute "off" reset circuits identified as 3–52 and 3–53 for the unit 3–49, 3–54 and 3–55 for the unit 3–50, and 3–56 and 3–57 for the unit 3–51. The juncture of each pair of voltage divider resistors is also connected to a plurality of units 3–58—3–60 having diodes connected and arranged as in the unit 3–49 and providing a pair of "on" reset circuits 3–61 and 3–62 for the unit 3–58, 3–63 and 3–64 for the unit 3–59, and 3–65 and 3–66 for the unit 3–60. Of these plural reset circuits, 3–61, 3–63 and 3–65 comprise "on" reset circuits for the three multivibrators included in the 3-step counter 3–35 while circuits 3–52, 3–54 and 3–56 comprise "off" reset circuits for the corresponding same multivibrators of the counter 3–35. With this arrangement, the multivibrators of the 3-step counter 3–35 are individually either set on or off depending upon the number of fields read in the card at the first reading station as indicated by the grounding of the circuits 3–40—3–42 in the manner earlier explained.

(2) EARLY TEST AND TRACK ADVANCE

As the data from each card is placed into storage in a storage track, a check is made to ascertain whether the data from the next card can be accepted in its entirety into the remaining storage space of the track. This is accomplished by using the Home pulse generated in the ouput circuit 1–24 of the FIG. 1 timing system. When the load control multivibrator 3–21 is on during a store operation, the output potential of the inverter 3–22 conditions a gate 3–70 to receive a Home pulse from the output circuit 1–24. If such a Home pulse occurs during the load operation, it indicates that loading is entering the sixth sector of the storage track. In this event, the Home pulse is translated by the gate 3–70 through an inverter 3–71 to turn on an early test multivibrator 3–72.

The output circuit 3–72*o* of the latter multivibrator conditions an AND gate 3–73 to receive and translate a positive pulse potential developed in an output circuit 3–74*o* of a multivibrator 3–74 as the latter goes through a cycle of operation. Specifically, the multivibrator 3–74 is turned on through an AND gate 3–75, which is conditioned by an early scan control potential pulse generated by a CB contactor 3–68 arranged to close its contacts at 285° machine time and open them at 315° machine time. The pulse which turns on the multivibrator through gate 3–75 is that developed in the output circuit 1–35*o* of the timing circuit of FIG. 1 and occurring at about 300° machine time. The multivibrator 3–74 is thereafter turned off by the next S pulse generated in the output circuit 1–21 of the FIG. 1 timing system and translated through an inverter 3–76.

When the multivibrator 3–74 turns off, the potential pulse developed in its output circuit 3–74*o* is translated by the gate 3–73 (earlier conditioned by the on state of the early test multivibrator 3–72) and turns on a multivibrator 3–77. The on condition of the multivibrator 3–77 generates a positive potential pulse which when translated through inverters 3–78 and 3–79 conditions an AND gate 3–80 to translate field mark pulses. These are received from the output circuit 2–17*o* of the shift register (FIG. 2), and are applied through inverters 3–81 and 3–82 to the gate 3–80. It can be shown that the shift register has only field marks in it and is stepping at this time, and the field marks are circulating through the register since the relay 2–23 is closed to its contact 2–25 (FIG. 2).

At the time the multivibrator 3–74 turned off, it turned on a multivibrator 3–83 and the potential developed in the output circuit 3–83*o* of this multivibrator is translated through an inverter 3–84 to condition an AND gate 3–85 to translate any field marks translated by the AND gates 3–80.

The multivibrator 3–83 is turned off when the binary counter 3–15 goes off after it and the counter 3–14 have counted 80 characters from the end of the last store operation (during which the Home pulse was received to turn on the early test multivibrator 3–72). The multivibrator 3–77 is turned off by the second S pulse from that which turned the multivibrator 3–74 off and thereby caused the multivibrator 3–77 to be turned on. Thus the latter during its on period essentially measures a sector interval extending from one S time to a succeeding S time. Note further that the counters 3–14 and 3–15 also measure a sector interval as referenced from the end of the last store operation. Thus the absence of any field marks translated by the gate 3–80 during the interval beginning with the time when the multivibrator 3–77 turns on and ending with the time when the counter 3–15 has finished its 80 character count shows that all of the field marks of the newly entering card have occurred prior to turn on of the multivibrator 3–77 at S time. This, of course, means that all of such field marks must occur between the time when the counter 3–14 starts counting from the end of the last store operation and the time of occurrence of the next S pulse which turns the multivibrator 3–77 on by turning the multivibrator 3–74 off. The absence of any field marks translated by the gate 3–80 during the on period of the multivibrator 3–83 accordingly shows that the data of the newly entering card will go in entirety into the remaining available space of the storage track in use since it will all occur between the beginning count of the counter 3–14 and 3–15 and the next occurring S time. In this event the multivibrator 3–83 turns off with the binary counter 3–15 and closes down the gate 3–85 so that the multivibrator 3–86 remains off.

However, if during the time the multivibrator 3–83 is on, a field mark is translated by the AND gate 3–80 it will also be translated by the AND gate 3–85 and will turn the multivibrator 3–86 on. When this occurs, the early test operation shows that all of the data from the newly entering card will not fit in its entirety into the remaining available storage space of the storage track then in use. An operation now takes place which so stops and later starts the counter 3–14, 3–15 and 3–16 that any field or fields of the newly entering card which a further test shows will fit into the remaining storage space of the track in use are stored in the latter. This operation positions the terminating field mark of the stored field or fields coincident with the S1 mark indicating the end of the sixth sector of the storage track. The manner in which this is accomplished will now be considered.

When the multivibrator 3–86 is turned on by a field mark translated by the gates 3–80 and 3–85, it cannot be turned off until an advance is made from the full storage track in use to a new storage track. During this interval while it is on, it conditions an AND gate 3–87 to turn on a multivibrator 3–90 when a 4-step counter 3–88 turns off. The first three input multivibrators of this counter are preset with the counter 3–35 by operation of units 3–49—3–51 and 3–58—3–60 as earlier described. Additionally, the last multivibrator of the 4-step counter 3–88 is always reset off from an output circuit 3–91 of a pair of diodes 3–92 and 3–93 which are connected as shown to the pairs of diodes 3–48, 3–43 and 3–46, 3–44 associated with each of the reset input lines 3–40—3–42.

The counter 3–88 begins its count with the first field mark translated by the AND gate 3–80, applied to the counter through an inverter 3–89, and after counting the full number of field marks of the newly entering card (including the initial or beginning field mark and the last or terminating field mark) turns off to turn the multivibrator 3–90 on through the gate 3–87. The resulting potential developed in the output circuit 3–90*o* of this multivibrator is applied through an inverter 3–94 to clamp off the output of the inverter 3–24 and thereby stop the counting operation of the counter 3–14, 3–15 and 3–16 by terminating the supply of advance pulses to the counter from the inverter 3–24. The next S pulse which is translated by the inverter 3–76 turns the multivibrator 3–90 off and allows the counter 3–14, 3–15 and 3–16 to resume its counting operation. The early test multivibrator 3–72 turns off with the multivibrator 3–90 and thus terminates further early field tests since a track advance is now imminent. An analysis will show that in thus stopping the operation of the counter 3–14, 3–15 and 3–16 its resumed count now so starts the load operation (by operation of the FIG. 1 timing system) that a gap occurs in the storage track between the end of the last stored data and the beginning of the next data to be stored. This gap is such that one or more fields of data of the newly entering card, now read at reading station two, will just use the remaining storage space of the track at which time an advance pulse is generated by the FIG. 3 control system and is applied to the transfer gate 2–47 (FIG. 2) to cause transfer exactly at S1 time to a new storage track. The manner in which this storage pulse is developed will now be considered.

When the multivibrator 3–86 turns on, the potential in its output circuit 3–86*o* is translated through inverters 3–95 and 3–96 to condition an AND gate 3–97. The latter is further conditioned when the load start CB contacts 3–10 close to turn on in succession multivibrators 3–11, 3–12 and 3–18. It is the potential in the output circuit 3–18*o* of the latter which, when translated through the inverter 3–19, also conditions the AND gate 3–97. A Home pulse from the output circuit 1–24 of FIG. 1 is used to turn on a multivibrator 3–98 which is then turned off by the next S pulse from the output circuit 1–21 of the FIG. 1 system. The potential in the output circuit 3–98*o* of this multivibrator is translated through an inverter 3–99 and an amplifier and pulse shaper 3–100 to the AND gate 3–97, and this shaped pulse constitutes the advance pulse which effects the transfer from the filled storage track to the new storage track. To this end, the shaped pulse is translated through the gate 3–97, through an amplifier and pulse shaper 3–101, an inverter 3–102, and an amplifier 3–103 to the transfer gate 2–47 of FIG. 2. It will be noted that this transfer accordingly takes place at the first S pulse after the Home pulse (S1 time) so that the new store operation accordingly starts in the second sector past Home and allows the Home pulse to be available for the next early test operation as described above.

The advance pulse translated by the amplifier 3–101 is applied through its output circuit 3–101*o* to turn off the track advance multivibrator 3–86. It also is translated through an amplifier 3–104 to turn off (by pull over) the multivibrator 3–18. The multivibrator 3–18 in turning off conditions the AND gate 3–38, through inverter 3–37, to turn off the load control multivibrator 3–21 and terminate the store operation. This permits the counter 3–14, 3–15 and 3–16 to resume its counting operation (starting at S1 time) since the clamping action of the inverter 3–23 is removed from the output of the inverter 3–24. The advance pulse translated by amplifier and wave-shaper 3–101 is also translated through amplifier and wave-shaper 3–105 and amplifier 3–106 to turn on (by pull over) the multivibrator 3–12. In this, the potential pulse developed in the output of unit 3–105 has a duration of 30 milliseconds to insure time for the track advance mechanical operation before loading is resumed. The store operation now resumes on the new storage track in normal manner, as described above, when the counter 3–16 turns off again at S1 time to cause the multivibrator 3–13 to go through a cycle of operation and turn the multivibrator 3–12 off. This turns the multivibrator 3–18 on again, and the latter through inverter 3–19 conditions the gate 3–20 to turn the multivibrator 3–21 on and start the new load operation at S1 time following the Home pulse. The operation in this regard is the same as the load operation previously described except that it resumes on the new track to store as much remaining data information from the card at reading station two as could not be received into the remaining storage space of the old storage track from which the transfer was made.

From the foregoing description of the transfer operation, it will be apparent that one or more fields of a last card will be stored in entirety in the old storage track, and that the remaining field or fields of this card are stored in the new storage track beginning at S1 time. In this, the store operation in the old track terminated at S1 time and the store operation in the new track initiated at S1 time so that the transfer is coincident at S1 time as between the old and new track and also is coincident with a field mark of the card.

It may be noted that once the early test multivibrator 3–72 is turned on by the occurrence of a Home pulse during a loading operation, it is not turned off again until a track advance is imminent as evidenced by the fact that the multivibrators 3–86 and 3–90 have been turned on. Thus after the early test multivibrator 3–72 turns on, several succeeding cards may have such small compacted fields as to enable storage of the data information of these cards in entirety in the near-full storage track. Nevertheless, the fact that the early test multivibrator 3–72 is on causes an early test of the field length of each such card to be made until eventually the data information of a final card is found to be too long to be accommodated in the storage track and a track advance thereupon occurs. Should it happen that several cards of short field length have been stored in the sixth sector of the storage track, it is possible that not even the first field of a final card can be accepted into the remaining storage space of this track. In this event, the unused storage space of the track appears after the last stored group of data information and storage in the new track begins with the first field of a succeeding card.

(3) LOAD CHECK

The control system of FIG. 3 performs a continuous check on the store or loading operation. To this end, the load check arrangement includes an 80 step counter and one phase of the checking operation is premised upon the concept that the store or loading operation should always be completed within a period of 80 characters and that no field marks should occur between the time a store operation is completed and the end of an 80 character period which commences at the initiation of the load operation. A check is made specifically for three types of error: (1) complete failure to start loading; (2) presence of extra field marks or an early end of loading; and (3) missing field marks or too long a loading period (in the event of a storage track advance during a loading cycle, the operation of the check system is interrupted to prevent a false error indication of a prolonged loading period).

The load check system includes an 80 step counter 3–110 which is advanced or stepped by 1 bit time pulses translated to the counter advance circuit through an inverter 3–111 and an inverter 3–112. An inverter 3–113 and an inverter 3–114 independently comprise clamping controls over the output of the inverter 3–112 to terminate the translation by the latter of 1 bit advance pulses. The inverter 3–113 is coupled to an output circuit **3–115*o* of a multivibrator 3–115 which is initially reset off during each load cycle by a reset CB contactor 3–116. This contactor closes its contacts at approximately 530° of machine time prior to the load start operation under control of the CB contactor 3–10. The reset circuit includes a diode rectifier 3–117 which translates a negative potential from the CB contactor 3–116 to turn and hold off the multivibrator 3–115 by pullover. While the multivibrator 3–115 is off, the lowered potential in its output circuit 3–115*o* is inverted to a high output potential in the output circuit of the inverter 3–113 and this permits 1 bit advance pulses to be supplied through the inverter 3–112 to step the counter 3–110. When the counter has counted through 80 characters, the output multivibrator unit of the counter turns off and in doing so turns the multivibrator 3–115 on. The elevated potential in the multivibrator output circuit 3–115*o* when now translated through the inverter 3–113 clamps off the output of the inverter 3–112 and terminates the supply of 1 bit advance pulses to the counter 3–110** which accordingly ceases its counting operation.

When the load set-up multivibrator 3–12 turns off to start a load operation, it turns off through its output circuit **3–12*o* the multivibrator 3–115 and allows 1 bit advance pulses to the thereupon supplied through the inverters 3–112 and 3–111 to the counter 3–110. Eighty characters later the counter 3–110 turns multivibrator 3–115 on again and stops the counting operation. If a track advance occurs during the loading operation, the counter 3–110 must stop while loading is held up in the manner previously explained. To this end, the advance pulse translated by the amplifier 3–101 is applied to an AND gate 3–118 to condition the latter to translate a 10 bit delayed field mark translated by the inverter 3–32. This translated field mark turns on a multivibrator 3–119 which, through inverter 3–114 terminates the supply of 1 bit advance pulses to the counter 3–110. The multivibrator 3–119 is initially reset off, in similar fashion to the multivibrator 3–115, through a diode rectifier 3–120 from the CB contactor 3–116. The multivibrator 3–119 is turned off, to allow the counter 3–110 to resume counting, when the load control multivibrator 3–21** turns on again to resume the store operation.

The load check system includes a multivibrator 3–122 which in its on condition will cause an inverter 3–123 to release its claiming effect on the output of an inverter 3–124. The latter translates a potential from a CB contactor 3–125, which closes its contacts at the completion of the maximum loading time used, to an error output circuit 3–126 to energize an error relay (not shown) providing an error alarm. This alarm may be visual as by using the error relay to turn on a light audible as where the relay energizes a bell or buzzer, or may terminate operation of the loading system by using the error relay for system control purposes. The multivibrator 3–122 is initially reset on through a diode rectifier 3–127 from the CB contactor 3–116.

The presence of extra field marks for any reason, or an indication that the loading operation ended too soon, is indicated by operation of a multivibrator 3–128 which when on conditions an AND gate 3–129 through an inverter 3–130 to translate field mark pulses from the output circuit **2–45*o* of the field mark gate 2–45 (FIG. 2). Any such field mark translated through the gate 3–129 turns the multivibrator 3–122 on to allow an error signal to be translated to the error output circuit 3–126. The multivibrator 3–128 is turned off through the output circuit 3–35*o* of the 3-step counter 3–35 when the latter turns off to terminate a loading operation by turn off of multivibrator 3–18. When the multivibrator 3–128 turns off, it turns on a multivibrator 3–131 which is initially reset on through a diode rectifier 3–132 from the CB contactor 3–116. The multivibrator 3–131 is thereafter reset off again by the potential pulse developed in the output circuit 3–110*o* of the counter 3–110 when the last stage of the latter turns off at the end of its 80 character count. While the multivibrator 3–131 is on, it conditions an AND gate 3–133 to accept and translate the turn-off pulse of the counter 3–110 and thereby turn on the multivibrator 3–128 at the same time that the multivibrator 3–131** is turned off by the counter.

The load check system indicates failure properly to start loading in the following manner: at reset time, as determined by the CB contactor 3–116, multivibrator 3–122 is reset on. When loading starts and the load control multivibrator 3–21 turns on, it will turn off the multivibrator 3–122 and thus prevent the development of any error signal in the error output circuit 3–126. If for any reason the load control multivibrator 3–21 fails to turn on to start the loading operation, multivibrator 3–122 will stay on with the result that an error signal is developed in the error output circuit 3–126 from the CB contactor 3–125.

The operation of the load check system in detecting the presence of extra field marks or an early end of a loading operation is as follows. Assume that there should be three fields and therefore four field marks in the card read at the second reading station. Assume further that through some error a fifth field mark is present during the 80 character count of the counter 3–110. The last multivibrator of the field mark counter 3–35 would turn off after the fourth field mark, thereby turning multivibrator 3–128 off and multivibrator 3–131 on. With multivibrator 3–128 off at the fourth field mark, field mark number five (occurring before the counter 3–110 had completed its count to turn the multivibrator back on) would be translated through the gate 3–129 to turn on the error multivibrator 3–122 which would thereupon permit the CB contactor 3–125 to develop an error signal in the error output circuit 3–126. Once the error multivibrator 3–122 turns on, it will stay on until the next load cycle and the resulting error signal will accordingly actuate the error relay to provide an error alarm. If for any reason the load control multivibrator 3–21 turned off to stop the loading operation too soon, the same sequence of events would occur and an error signal would be developed.

Consider now the operation of the load check system for missing field marks or for too long a period of loading. Assume again that the read card had three fields and thus four field marks and that one such field mark is missing for some reason so that only three appear during the 80 character count interval. Since the field mark counter 3–35 needs the fourth field mark to turn off its output circuit multivibrator and thus terminate loading by turning off the multivibrator 3–18, the counter 3–35 must wait until the first or beginning field mark appears again. This of course would occur after the 80 character count interval, and therefore the counter 3–110 would have completed its count before the multivibrator 3–128 was turned off by the counter 3–35 to turn on the multivibrator 3–131 and condition the gate 3–133 to translate the turn-off pulse of the counter 3–110. Since the latter performs only one counting operation per loading cycle, no more turn-off pulses are available from it. The multivibrator 3–128 would be turned off when the counter 3–35 developed a turn off pulse on the next or beginning field mark, but the multivibrator could not be turned back on until the next reset time. Since the loading operation is continuing until completion of the field mark count by the counter 3–35, field marks remain available from the revolvers 2–42 and 2–43 (FIG. 2) and are translated by the gate 3–129 to turn on the error multivibrator 3–122 and thus develop an error signal in the error output signal 3–126. Any other failure in the loading cycle which would cause the load control multivibrator 3–21 to fail to stop loading would produce a similar result.

(4) AUTOMATIC RESET SYSTEM

The FIG. 3 control system automatically resets itself for proper operation each time the data information storage system is placed in operation or when the continuous flow of data cards through the reading stations is interrupted for any reason.

For this purpose, the associated business machine is provided with a run-in CB contactor 3–135 which turns on a monostable multivibrator 3–136. The cycle of operation of this multivibrator develops a pulse potential which is translated through inverter 3–137 to a plurality of diode reset units 3–139 and 3–140 having a construction and arrangement similar to that shown for the diode unit 3–49. The output circuits 3–141—3–146 are connected to turn off (by pull over) the following respective multivibrators of the FIG. 3 system: 3–72, 3–86, 3–18, 3–29, and 3–122. The reset output circuit 3–145 resets the multivibrator 3–21 off.

The counter 3–14, 3–15 and 3–16 will be operating at this time and the turn off time of the last multivibrator stage in the counter 3–16 may have no particular relation to the sector S1 pulse time which occurs immediately after the Home pulse time. Since the counter controls the start of loading which must begin at the sector S1 time, the reset system provides a means of establishing this relationship. It will be recalled that S–1 time is indicated by the turn off of multivibrator 3–98 (it is turned on by the Home pulse and is turned off by the next sector or S–1 pulse). During the time when the multivibrator 3–136 is on, it conditions a gate 3–148 to translate the load start pulse generated when the last multivibrator of the counter 3–16 goes off at the end of the 348 character count. This translated pulse turns on the multivibrator 3–149, and the elevated potential in the output circuit **3–149*o* of the latter is applied to the inverter 3–94 which acts as a clamp on the inverter 3–24 to terminate further translation of 1 bit advance pulses to the counter and stop the counter operation. Thus when multivibrator 3–136 is on, the counter will stop itself when it finishes its counting operation. At S–1 time, the multivibrator 3–98 turns off and thereby turns off the multivibrator 3–149** allowing the counter to start again.

CONVERTER

It is the purpose of the converter 2–44 shown in FIG. 2 to convert a 12 bit card code to a 6 bit binary code in serial form suitable for storage in the magnetic storage tracks such as tracks 2–48 and 2–49 of FIG. 2.

Table I following is a representative card code by which the information capacity of a card may be expanded by multiple hole punching of preselected index point columns in the different rows to provide 6 bit binary-code storage for a range of binary values from 0 through 47.

*Table I*

REPRESENTATION OF CARD CODE BY MACHINE CODE

| Card code | Machine code | | | | | | Binary value | Card code | Machine code | | | | | | Binary value |
|---|---|---|---|---|---|---|---|---|---|---|---|---|---|---|---|
| | 0 | 1 | 2 | 3 | 4 | 5 | | | 0 | 1 | 2 | 3 | 4 | 5 | |
| Blank | 0 | 0 | 0 | 0 | 0 | 0 | 0 | 0–7 | 0 | X | X | 0 | 0 | 0 | 24 |
| 12–1 | 0 | 0 | 0 | 0 | 0 | X | 1 | 0–8 | 0 | X | X | 0 | 0 | X | 25 |
| 12–2 | 0 | 0 | 0 | 0 | X | 0 | 2 | 0–9 | 0 | X | X | 0 | X | 0 | 26 |
| 12–3 | 0 | 0 | 0 | 0 | X | X | 3 | 0 | 0 | X | X | 0 | X | X | 27 |
| 12–4 | 0 | 0 | 0 | X | 0 | 0 | 4 | 1 | 0 | X | X | X | 0 | 0 | 28 |
| 12–5 | 0 | 0 | 0 | X | 0 | X | 5 | 2 | 0 | X | X | X | 0 | X | 29 |
| 12–6 | 0 | 0 | 0 | X | X | 0 | 6 | 3 | 0 | X | X | X | X | 0 | 30 |
| 12–7 | 0 | 0 | 0 | X | X | X | 7 | 4 | 0 | X | X | X | X | X | 31 |
| 12–8 | 0 | 0 | X | 0 | 0 | 0 | 8 | 5 | X | 0 | 0 | 0 | 0 | 0 | 32 |
| 12–9 | 0 | 0 | X | 0 | 0 | X | 9 | 6 | X | 0 | 0 | 0 | 0 | X | 33 |
| 11–1 | 0 | 0 | X | 0 | 0 | X | 10 | 7 | X | 0 | 0 | 0 | X | 0 | 34 |
| 11–2 | 0 | 0 | X | 0 | X | X | 11 | 8 | X | 0 | 0 | 0 | X | X | 35 |
| 11–3 | 0 | 0 | X | X | 0 | 0 | 12 | 9 | X | 0 | 0 | X | 0 | 0 | 36 |
| 11–4 | 0 | 0 | X | X | 0 | X | 13 | 12–3–8 | X | 0 | 0 | X | 0 | X | 37 |
| 11–5 | 0 | 0 | X | X | X | 0 | 14 | 12–4–8 | X | 0 | 0 | X | X | 0 | 38 |
| 11–6 | 0 | 0 | X | X | X | X | 15 | 12 | X | 0 | 0 | X | X | X | 39 |
| 11–7 | 0 | X | 0 | 0 | 0 | 0 | 16 | 11–3–8 | X | 0 | X | 0 | 0 | 0 | 40 |
| 11–8 | 0 | X | 0 | 0 | 0 | X | 17 | 11–4–8 | X | 0 | X | 0 | 0 | X | 41 |
| 11–9 | 0 | X | 0 | 0 | X | 0 | 18 | 11 | X | 0 | X | 0 | X | 0 | 42 |
| 0–2 | 0 | X | 0 | 0 | X | X | 19 | 0–1 | X | 0 | X | 0 | X | X | 43 |
| 0–3 | 0 | X | 0 | X | 0 | 0 | 20 | 0–3–8 | X | 0 | X | X | 0 | 0 | 44 |
| 0–4 | 0 | X | 0 | X | 0 | X | 21 | 0–4–8 | X | 0 | X | X | 0 | X | 45 |
| 0–5 | 0 | X | 0 | X | X | 0 | 22 | 3–8 | X | 0 | X | X | X | 0 | 46 |
| 0–6 | 0 | X | 0 | X | X | X | 23 | 4–8 | X | 0 | X | X | X | X | 47 |

It was earlier pointed out that the No. 1 revolver 2–42 of FIG. 2 stored the data information of card rows 9–4 whereas revolver 2–43 stored the data information of card rows 3–12. FIG. 4 represents segments of the revolver tracks 2–42 and 2–43 and illustrates more clearly the physical relationship in storage of this temporarily stored data information.

FIG. 5 represents schematically the construction of the converter 2–44 which includes a series-to-parallel converter 5–10 arranged to receive in series form the 12 bit card-coded data information stored in revolver 2–42 and supply it in parallel form to a rectangular matrix 5–11. A series-to-parallel converter 5–12 likewise receives the series stored card-coded data information from the revolver 2–43 and supplies the information of card data rows 1, 2 and 3 to the rectangular matrix 5–11 and of data rows 0, 11 and 12 to a rectangular matrix 5–13. The converters 5–10 and 5–12 operate under control of "4" bit pulses supplied from the output circuit 1–17 of the delay line 1–12 of FIG. 1, also under control of delay line Sync pulses supplied from the Sync pulse generator output circuit 1–9, and further under control of a gating pulse which occurs at "5" bit time and is generated by a gate pulse-forming circuit 5–14. The latter receives the "4" bit pulse from the delay line output circuit 1–17 and uses it to trigger a monostable multivibrator which generates a pulse of approximately 6 microseconds duration. The last-mentioned pulse is then supplied to a second monostable multivibrator in the unit 5–14, and the trailing edge of the pulse is used to trigger the latter to generate a gating pulse which begins a short interval before the leading edge of each "5" bit pulse and terminates an equal interval after the trailing edge of the "5" bit pulse.

The detailed construction of the units 5–10—5–13 will be described later, but for the moment suffice it to say that the rectangular matrix 5–11 and the rectangular matrix 5–13 receive the data information presented in parallel fashion character by character from the converters 5–10 and 5–12 and supply this information to a code conversion matrix 5–15 which routes the information over a plurality of output circuits (totaling 47 in number) to an encoding matrix 5–16. The latter combines the information thus routed to it into the selected binary code group relationships shown in Table I for parallel presentation to a parallel-to-serial converter 5–17. The operation of the latter is controlled by 3 bit pulses from the output circuit 1–16 of the delay line 1–12 of FIG. 1 and by delay line Sync pulses from the Sync generator output circuit 1–9. The binary code information presented in parallel manner to the converter 5–17 is supplied in binary series form through the output circuit **2–44*o* of the converter to the gate 2–46** as shown in FIG. 2.

The arrangement of the series-to-parallel converter 5–10, or of the corresponding converter 5–2, is shown schematically in FIG. 6. It includes an input circuit 6–10 through which the output of the associated revolver is applied to an amplifier 6–11. The output of the amplifier 6–11 is applied both to a negative coincidence gate 6–12 and to a synchronized delay line 6–13 having six delay stages 6–14—6–18 operating under control of bit Sync pulses supplied to each from the bit Sync generator output circuit 1–9. This delay line is of the type disclosed in the copending application Serial No. 346,938, filed April 6, 1953, entitled "Synchronized Electronic Delay Line," in the name of Genung L. Clapper, and assigned to the same assignee as the present application. The outputs of the delay stages 6–14—6–18 are likewise applied to respective negative coincidence gates 6–19—6–22. The 5 bit time gating pulses generated in the output circuit **5–14*o* of the unit 5–14 of FIG. 5 are applied to an amplifier 6–23 having an anode load resistor 6–24 across which a gating potential is developed and applied to each of the gates 6–12 and 6–19—6–22**.

Thus the 12 bit card-code data information bits serially read-out of one of the revolvers 2–42 or 2–43 is translated through the amplifier 6–11 to the delay line 6–13 where each bit is advanced through the delay line at bit time by the bit synchronizing signal applied from the output circuit 1–9 of the bit signal generator. At the fifth bit time, all of the coded bits occurring during a character interval appear concurrently or in parallel relation at the output of the amplifier 6–11 and the several outputs of the delay line 6–13 and are translated in parallel fashion through the gates 6–12 and 6–19—6–22 by the 5 bit gating pulse applied from the amplifier 6–23. These parallel-presented gate-bit pulses translated by the gates 6–12 and 6–19—6–22 are used to turn on respective multivibrators or triggers 6–26—6–31 which are thereafter all reset off at the succeeding 4 bit time by a 4 bit pulse translated through the output circuit 1–17 of the delay line 1–12 of FIG. 1. The code bits thus presented to the triggers are stored in the latter for approximately 41⅔ microseconds.

FIG. 7 is a circuit diagram indicating the arrangement of the rectangular matrix 5–11, the rectangular matrix 5–13, the conversion matrix 5–15, and the encoding matrix 5–16. The several outputs of the multivibrators 6–26—6–31 of the FIG. 6 converter arrangement, and of a second similar such unit, are applied to the rectangular matrices 5–11 and 5–13 through matrix driver amplifiers typified by the amplifier 7–10. This amplifier is of the push-pull type having anode impedances comprised only by diode rectifiers 7–11 and 7–12 which may be considered as clamping diodes on the driver tubes. This type of anode circuit is desirable because of the wide range of effective load resistances encountered when converting different characters. The usual anode load resistors are omitted from the driver amplifiers to make possible the lowering of the resistance of some of the resistors in the following diode matrices without exceeding the plate dissipation rating of the matrix driver tubes.

While only one driver amplifier 7–10 is here shown, it will be understood that this is done merely to simplify this figure of the drawing and that a driver amplifier is employed between each of the output multivibrators of the converters 5–10 and 5–12 (such as the multivibrators 6–26—6–31 of the FIG. 6 arrangement) and corresponding pairs of matrix circuits 7–13$_1$—7–13$_9$, 7–14$_0$, 7–14$_{11}$ and 7–14$_{12}$. It will further be understood in this regard that matrix circuits 7–13$_1$—7–13$_3$, 7–14$_0$, 7–14$_{11}$ and 7–14$_{12}$ are coupled through driver amplifiers to the output multivibrators of the converter 5–12 as indicated in FIG. 5 and that the matrix circuits 7–13$_4$—7–13$_9$ are coupled through driver amplifiers to output multivibrators of the converter 5–10.

The pairs of circuits 7–13$_1$, 7–13$_9$ of the rectangular matrix 5–11 and the pairs of circuits 7–14$_0$, 7–14$_{11}$ and 7–14$_{12}$ of the rectangular matrix 5–13 are directly connected to or are coupled through diode rectifiers D as indicated to a plurality of matrix output circuits 7–15—7–30. In these matrices arrangements the directly connected input and output conductors are normally maintained at lowered potential, and the other conductor of the input conductor pair normally at an elevated potential, by the operation of the preceding driver amplifier and associated multivibrator. A code bit in turning on a given multivibrator has the effect of changing in opposite senses the potentials of such input conductor pair. Thus assume for example that the matrix conductor pair 7–13$_2$ is coupled through the driver amplifier 7–10 as shown and that the latter is coupled to the output circuits of the multivibrator 6–30. If a 2 bit code pulse were present to identify a code character, this pulse would appear in the output circuit of the delay stage 6–17 at the time of the 5 bit gating pulse and accordingly would be translated through the gate 6–22 to turn on the multivibrator 6–30. This would drop the potential in the output circuit **6–30*o*' of the multivibrator 6–30 and elevate the potential in its output circuit 6–30*o*. The resultant output potentials when translated by the driver amplifier 7–10 would reduce the potential on the conductor A of the matrix conductor pair 7–13$_2$ and elevate the potential on the conductor B of this pair. This would result in lowering the potential of the matrix output circuit conductor 7–16 and would result in the output circuit conductor 7–26 being raised to an elevated potential in the event that none of the diode rectifiers D which are connected to the conductor 7–26** are in the conductive state by virtue of elevated potentials on all of the input matrix circuits to which these diode rectifiers are connected. It will therefore be apparent that the parallel presented bits identifying a coded character result in the development of elevated potentials in particular ones of the matrix output circuits.

The elevated potentials last mentioned are selected in prearranged combinations, in accordance with the card code used, by the conversion matrix 5–15 and encoding matrix 5–16 to develop a 6 bit binary code. FIG. 7 shows the circuit arrangement for the zero conversion and encoding matrices which from Table I corresponds to the binary value 27 and the machine code 011011. For this purpose, a diode rectifier 7–32 couples the matrix output circuit 7–26 to the anode of four rectifier tubes 7–33—7–36 which are also connected through a diode rectifier 7–37 to the matrix output circuit 7–28. The anodes of these tubes are coupled through a resistor 7–38 to a positive source of potential, thus to provide a form of AND gate which biases the anodes of the rectifier tubes 7–33—7–36 to a positive potential whenever both of the diodes 7–32 and 7–37 are rendered nonconductive by concurrent elevated potentials on the matrix output circuits 7–26 and 7–28. The rectifier tubes 7–33—7–36 translate the positive potential thus impressed on their anodes to individual encoding matrix amplifiers each similar to the amplifier 7–40 which is shown as connected to the rectifier tube 7–35. Since Table I shows that for the zero card code the encoding matrix should develop 4 outputs corresponding to the 1, 2, 4 and 5 machine codes, it will be understood that the amplifier (not shown) which is connected to the diode 7–36 will provide the bit 1 output of the encoding matrix, the amplifier 7–40 will provide the bit 2 output, the amplifier connected to the diode tube 7–34 will provide the bit 4 output, and the amplifier connected to the diode tube 7–33 will provide the bit 5 encoding output as indicated in FIG. 7.

While only the zero conversion and encoding matrices are shown in detail in FIG. 7, it will be appreciated that there will be one pair of such matrices for each card code employed, and that each such pair of matrices will be coupled to appropriate ones of the matrix output circuits 7–15—7–30 by which to couple these output circuits the 6 encoding matrix output amplifiers. In this, each output amplifier (such as the amplifier 7–40) is common to the output circuit of each encoding matrix which develops a given code bit (i.e. the 2 bit code for the amplifier 7–40).

The parallel-to-serial converter 5–17 has a construction as represented in FIG. 8 and includes inverters 8–10—8–15 which are coupled to individual ones of the output amplifiers of the encoding matrix described in connection with FIG. 7. The outputs of the inverters 8–10—8–15 comprise an input circuit of respective AND gates 8–16—8–21 which are opened up by 3 bit Sync pulses from the output circuit 1–16 of the FIG. 1 timing system. The outputs of the AND gates 8–16—8–21 are translated through respective inverters 8–22—8–27 to the input circuits of respective delay stages 8–28—8–32 of a synchronized delay line 8–33 of the Genung L. Clapper type earlier mentioned. The delay line includes output delay stages 8–34 and 8–35, and is synchronized in operation by bit synchronizing pulses applied from the output circuit 1–9 of the FIG. 1 timing system. The output of the delay line 8–33 is translated through an amplifier 8–36 of the output circuit **2–44*o*** of the converter.

The potential wave forms involved in the translation of a bit 4 machine code are indicated in FIG. 8, and it will be seen that the 4 bit pulse of 2 microsecond duration is applied to the delay stage 8–29 and is delayed by 7 bit periods in translation through the latter to emerge in the output circuit **2–44*o* of the converter at 4 bit time as indicated. Thus the delay line 8–33 receives the machine code presented to it in parallel fashion and converts this code to one in serial form at its output circuit 2–44*o***.

From the foregoing description of the invention it will be apparent that the data storage system embodying the invention enables maximum storage of data information in a given value of storage capacity, particularly in that such storage section of a storage medium stores as many complete groups of data information as can be accepted in entirety into the storage capacity of the section and also stores as many entire fields from the last group of data information as can be accepted within such storage capacity. This efficient use of the storage capacity from storage section to storage section of the storage medium results in a substantially continuous storage of data information in each section and from section to section. The data storage system of the present invention has the further advantage that it permits asynchronous operation as between the system and associated business machine supplying data information to it, particularly in that the flexibility of interconnection between the business machine and storage system is such that the two cooperate together in effecting translation of data information yet may have somewhat independent operations insofar as its own particular functions are concerned. There is the further advantage that the storage system maintains an automatic and continuous check on its own operation and provides error indications when system error for any of several reasons is encountered.

What is claimed is:

1. A data storage system comprising, storage means having a finite data storage capacity, means for translating groups of data information to storage in said storage means, each said group of information having individually distinguishable data subdivisions thereof, means responsive to the condition of data storage exceeding a predetermined quantity for predeterming prior to storage and for at least one further data group the number of data subdivisions thereof which can be accepted in entirety into storage without exceeding said finite storage capacity, and means responsive to said predetermination for controlling said translating means to restrict further storage to only said predetermined number of data subdivisions of that one of said further groups which if translated in entirety into storage would require said storage means to store in excess of its said finite storage capacity.

2. A data storage system comprising, storage means having a finite data storage capacity, means for translating successive groups of data information to successive storage in said storage means, each said group of information having individually distinguishable data subdivisions thereof, means responsive to the condition of successive data storage exceeding a predetermined quantity for predetermining prior to storage and for at least one succeeding data group the number of subdivisions thereof which can be accepted in entirely into storage without exceeding said finite storage capacity, and means responsive to said predetermination for controlling said translating means to terminate further translation into storage of data information in excess of said number of subdivisions of that data group which if translated in entirety into storage would require said storage means to store in excess of its said finite storage capacity.

3. A data storage system comprising, storage means having a finite data storage capacity, means for translating groups of data information to storage in said storage means, each said group of information having individually distinguishable data subdivisions thereof, means responsive to the condition of data storage exceeding a predetermined quantity for predetermining prior to storage and for at least one further data group the number of data subdivisions thereof which can be accepted in entirety into storage without exceeding said finite storage capacity, and means responsive to said predetermination for controlling said translating means to translate into storage any data group and said predetermined number of subdivisions of a last data group which can be stored in entirety without exceeding said finite storage capacity.

4. A data storage system comprising, storage means having a finite data storage capacity, means for translating groups of data information to storage in said storage means, each said group of information having data subdivisions individually distinguishable by subdivision indicia, means responsive to the condition of data storage exceeding a predetermined quantity and to said subdivision indicia for predetermining prior to storage and for at least one further data group the number of data subdivisions thereof which can be accepted in entirety into storage without exceeding said finite storage capacity, and means responsive to said predetermination for controlling said translating means to restrict further translation to storage to only said predetermined number of data subdivisions of that one of said further groups which if translated in entirety into storage would require said storage means to store in excess of its said finite storage capacity.

5. A data storage system comprising, storage means having a finite data storage capacity, means for providing indicia representative of preselected storage capacities in said means, means responsive to a preselected one of said indicia for initiating the translation into storage of groups of data information, each said group of information having individually distinguishable data subdivisions thereof, means responsive to a preselected other one of said indicia indicative to an approach to full storage capacity of said storage means for predetermining prior to storage and for at least one further data group the number of data subdivisions thereof which can be accepted in entirety into storage without exceeding said finite storage capacity, and means responsive to said predetermination for controlling said translating means to restrict further translation to storage to only said predetermined number of data subdivisions of that one of said further groups which if translated in entirety into storage would require said storage means to store in excess of its said finite storage capacity.

6. A data storage system comprising, storage means having a finite data storage capacity, means for providing marker signals representative of successively arranged partial storage capacities in said means, means responsive to a preselected initial one of said marker signals for initiating the translation of data information to storage in said storage means, each said group of information having individually distinguishable data subdivisions thereof, means responsive to the last of said successive marker signals indicative of an approach to full storage capacity of said storage means for predetermining prior to storage and for at least one further data group the number of data subdivisions thereof which can be accepted in entirety into storage without exceeding said finite storage capacity, and means responsive to said predetermination for controlling said translating means to restrict further translation to storage to only said predetermined number of data subdivisions of that one of said further groups which if translated in entirety into storage would require said storage means to store in excess of its said finite storage capacity.

7. A data storage system comprising, storage means having a finite data storage capacity, means for providing marker signals representative of successively arranged partial storage capacities in said means, means responsive to a preselected initial one of said marker signals for initiating the translation of groups of data information to storage in said storage means, each said group of information having data fields individually distinguishable by field markers, means responsive to the totalization of the field markers of each data group for terminating the translation of each said group to storage in said storage means, means responsive to the last of said marker signals and to said field markers for predetermining prior to storage and for at least one further data group the number of data fields thereof which can be accepted in entirety into storage without exceeding said finite storage capacity, and means responsive to said predetermination for controlling said translating means to restrict further translation to storage to only said predetermined number of data fields of that one of said further groups which if translated in entirely into storage would require said storage means to store in excess of its said finite storage capacity.

8. A data storage system comprising, storage means having a finite data storage capacity, means for translating groups of data information to storage in said storage means, each said group of information having individually distinguishable data subdivisions thereof, means responsive to the completion of each storage operation for initiating the succeeding storage operation to effect storage of data groups with the data information of one group forming in storage a continuation of the data information of both preceding and succeeding data groups, means responsive to the condition of data storage exceeding a predetermined quantity for predetermining prior to storage and for at least one further data group the number of data subdivisions thereof which can be accepted in entirety into storage without exceeding said finite storage capacity, and means responsive to said predetermination for controlling said translating means to restrict further translation to storage to only said predetermined number of data subdivisions of that one of said further groups which if translated in entirety into storage would require said storage means to store in excess of its said finite storage capacity.

9. A data storage system comprising, storage means having a finite data storage capacity, means for translating groups of data information to storage in said storage means, each said group of information having individually distinguishable data subdivisions thereof, sequential storage control means responsive to the completion of each storing operation for initiating a succeeding storing operation to effect storage of successive data groups with the data information of one group forming in storage a continuation of the data information of preceding and succeeding groups, means responsive to the condition of data storage exceeding a predetermined quantity for predetermining prior to storage and for at least one further data group the number of data subdivisions thereof which can be accepted in entirety into storage without exceeding said finite storage capacity, and means responsive to said predetermination for controlling said translating means and said sequential control means to limit the translation to storage of said predetermined number of data subdivisions of a final data group with said data subdivisions positioned in storage to utilize the last storage capacity of said storage means.

10. A data storage system comprising, storage means having a finite data storage capacity, means providing storage segment indicia representative of preselected storage capacities in said means, means responsive to an initial one of said storage segment indicia for initiating translation of successive groups of data information to storage in said storage means, each said group of information having fields distinguishable by field markers, a counter responsive to the completion of each storing operation for initiating the succeeding storing operation, test means responsive to the last of said storage segment markers for predetermining prior to storage and for at least one further data group the number of fields thereof which can be accepted in entirety into storage without exceeding said finite storage capacity, and means responsive to said predetermination for controlling said counter and said translating means to establish coincidence between the field marker terminating said last-mentioned fields and said initial storage increment marker to limit the translation to storage of said predetermined number of fields positioned in storage to utilize the last available storage capacity of said storage means.

11. A data storage system comprising, storage means having a finite data storage capacity, means for translating groups of data information to storage in said storage means, each said group of information having fields distinguishable by field markers, a first counter responsive to the completion of one storing operation for initiating the succeeding storing operation, a second counter for totalizing said field markers to terminate each storing operation, means responsive to the condition of data storage exceeding a predetermined quantity and including said second counter for predetermining prior to storage and for at least one further data group the number of fields thereof which can be accepeted in entirety into storage without exceeding said finite storage capacity, and means responsive to said predetermination for controlling said translating means to limit the translation to storage of said predetermined number of fields of a final data group.

12. A data storage system comprising, storage means having a finite data storage capacity, means for providing storage sector indicia indicative of sector segments of storage capacity of said means, means responsive to a first sector indicia for controlling said translating means to initiate translation of successive groups of data information to storage in said storage means beginning with a first sector segment thereof, each said group of information having individually distinguishable data subdivisions thereof, means responsive to the occurrence of a predetermined final sector indicia occurring during a storage operation for predetermining prior to storage and for at least one further data group the number of data subdivisions thereof which can be accepted in entirety into storage without exceeding said finite storage capacity, and means responsive to said predetermination for controlling said translating means to limit the translation to storage of said predetermined number of data subdivisions of that one of said further groups which if translated in entirety into storage would require said storage means to store in excess of its said finite storage capacity.

13. A data storage system comprising, storage means including storage sections each having a finite data storage capacity, means for translating groups of data information to storage in said storage means, each said group of information having individually distinguishable data subdivisions thereof, means responsive to the condition of data storage exceeding a predetermined quantity in one of said storage sections for predetermining prior to storage and for at least one further data group the number of data subdivisions thereof which can be accepted in entirety into storage without exceeding said finite storage capacity of said one section, and means responsive to said predetermination for controlling said translating means to terminate storage in said one storage section after storage of said predetermined number of data subdivisions of a final partially acceptable data group and resume storage in a second storage section with storage of the remainder of said final data group.

14. A data storage system comprising, storage means including storage sections each having a finite storage capacity, means for translating groups of data information to storage in said storage means, each said group of information having individually distinguishable data subdivisions thereof, means responsive to the condition of data storage exceeding a predetermined quantity in one of said storage sections for predetermining prior to storage and for at least one further data group the number of data subdivisions thereof which can be accepted in entirety into storage without exceeding said finite storage capacity of said one section, and means responsive to said predetermination for controlling said translating means to translate into storage in said one storage section said predetermined number of data subdivisions of a final partially acceptable data group and thereupon transfer to and store in a second of said storage sections the remaining subdivisions of said final data group.

15. A data storage system comprising, storage means including storage sections each having a finite storage capacity, means for translating groups of data information to storage in said storage means, each said group of information having fields distinguishable by field indicia, means responsive to the condition of data storage exceeding a predetermined quantity in one of said storage sections and to said field indicia for predetermining prior to storage and for at least one further data group the number of fields thereof which can be accepted in entirety into storage in said one storage section without exceeding said finite storage capacity thereof, and means responsive to said predetermination for controlling said translating means to terminate storage in said one storage section after storage of said predetermined number of fields of a final partially acceptable data group and to resume storage in another storage section with storage of the remaining fields of said final data group.

16. A data storage system comprising, data storage means, means for translating successive groups of data information to storage in said means, the longest of said data groups requiring a predetermined interval for translation to storage and each said group having a preselected number of field subdivisions identifiable by field indicia which are stored in said storage means with said each group of data information, storage error indicating means, means responsive to initiation of each data group storing operation for conditioning said error means to provide an error indication following completion of each data group storing operation, means operative during each data group storing operation for counting the number of field indicia appearing in each data group stored, means responsive jointly to a correct count by said counting means of said preselected number of field indicia and to completion of each data-indicia group storing operation for deconditioning said error means to suppress said error indication, and means responsive to an interval of storing operation exceeding said predetermined interval for reconditioning said error means once more to provide an error indication.

References Cited in the file of this patent

UNITED STATES PATENTS

| | | |
|---|---|---|
| 2,739,301 | Greenfield | Mar. 20, 1956 |
| 2,813,259 | Burkhart | Nov. 12, 1957 |

UNITED STATES PATENT OFFICE
CERTIFICATION OF CORRECTION

Patent No. 2,992,413 July 11, 1961

Francis V. Adams et al.

It is hereby certified that error appears in the above numbered patent requiring correction and that the said Letters Patent should read as corrected below.

Column 11, line 47, for "2-4" read -- 2-48 --; column 12, line 15, for "period" read -- periods --; line 25, for "to" read -- a --; line 34, for "pxeailned" read -- explained --; lines 37 and 38, for "bebinning" read -- beginning --; same column 12, line 49, for "later" read -- latter --; column 13, line 6, for "on" read -- a --; line 34, for "comprises" read -- comprise --; column 17, line 54, for "the", first occurrence, read -- be --; line 75, for "claiming" read -- clamping --; column 23, line 61, after "8-29" insert -- of the delay line --; column 24, line 46, for "entirely" read -- entirety --; column 27, line 6, for "accepeted" read -- accepted --.

Signed and sealed this 10th day of April 1962.

(SEAL)
Attest:

ERNEST W. SWIDER
Attesting Officer

DAVID L. LADD
Commissioner of Patents